(12) United States Patent
Yamada

(10) Patent No.: US 10,315,453 B2
(45) Date of Patent: Jun. 11, 2019

(54) ANTI-COUNTERFEITING STRUCTURE

(71) Applicant: TOPPAN PRINTING CO., LTD., Tokyo (JP)

(72) Inventor: Shizuka Yamada, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 15/941,198

(22) Filed: Mar. 30, 2018

(65) Prior Publication Data

US 2018/0222243 A1    Aug. 9, 2018

Related U.S. Application Data

(63) Continuation of application No. PCT/JP2016/079108, filed on Sep. 30, 2016.

(30) Foreign Application Priority Data

Oct. 2, 2015    (JP) .................. 2015-197214

(51) Int. Cl.
*B42D 25/23*    (2014.01)
*B42D 25/41*    (2014.01)
(Continued)

(52) U.S. Cl.
CPC ............ *B42D 25/373* (2014.10); *B23K 26/00* (2013.01); *B23K 26/57* (2015.10); *B32B 5/18* (2013.01);
(Continued)

(58) Field of Classification Search
CPC ....... B42D 25/23; B42D 25/324; B42D 25/41
See application file for complete search history.

(56) References Cited

U.S. PATENT DOCUMENTS

| | | | | |
|---|---|---|---|---|
| 4,507,346 A | * | 3/1985 | Maurer | ............... B42D 25/41 283/75 |
| 2006/0145468 A1 | * | 7/2006 | Plaschka | ............... B42D 25/41 283/72 |

(Continued)

FOREIGN PATENT DOCUMENTS

JP    2006-123174 A    5/2006

OTHER PUBLICATIONS

International Search Report with English translation and Written Opinion issued in International Application No. PCT/JP2016/079108 dated Jan. 10, 2017.

(Continued)

*Primary Examiner* — Kyle R Grabowski
(74) *Attorney, Agent, or Firm* — Foley & Lardner LLP

(57) ABSTRACT

The anti-counterfeiting structure includes an allochroic part having a characteristic of changing from a first material to a second material in response to laser irradiation, the allochroic part including a discolored part consisting only of the second material and having first information, and a foamable member having a characteristic of changing from an unfoamed state to a foamed state in response to laser irradiation, the foamable member including a foamed part that contains second information, the second information being associated with the first information and constituting, together with the first information, an information group unique to the anti-counterfeiting structure. At least a part of the discolored part does not overlap with the foamed part in a plan view of the discolored part and the foamed part.

17 Claims, 7 Drawing Sheets

(51) Int. Cl.
*B42D 25/324* (2014.01)
*B42D 25/373* (2014.01)
*B23K 26/00* (2014.01)
*B32B 5/18* (2006.01)
*B41M 5/26* (2006.01)
*G03H 1/02* (2006.01)
*B42D 25/40* (2014.01)
*B42D 25/36* (2014.01)
*B42D 25/328* (2014.01)
*B23K 26/57* (2014.01)
*B42D 25/21* (2014.01)
*B42D 25/45* (2014.01)
*B32B 5/20* (2006.01)

(52) U.S. Cl.
CPC ............... *B32B 5/20* (2013.01); *B41M 5/26* (2013.01); *B42D 25/21* (2014.10); *B42D 25/23* (2014.10); *B42D 25/324* (2014.10); *B42D 25/328* (2014.10); *B42D 25/36* (2014.10); *B42D 25/40* (2014.10); *B42D 25/41* (2014.10); *B42D 25/45* (2014.10); *G03H 1/02* (2013.01)

(56) References Cited

U.S. PATENT DOCUMENTS

2010/0181754 A1\* 7/2010 Labrec ............... B23K 26/60
283/95
2014/0227487 A1\* 8/2014 Warwick ............ B42D 25/425
428/159

OTHER PUBLICATIONS

Supplementary European Search Report regarding Application No. EP16851892.6, dated Sep. 3, 2018, 6 pps.

\* cited by examiner ively authenticated in order to enable visual authentication of the individual by use of the information authentication medium. Methods for adding information to the information authentication medium include laser-irradiating an allochroic layer provided with the information authentication medium (refer, for example, to PTL 1).

ANTI-COUNTERFEITING STRUCTURE

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2016/079108, filed on Sep. 30, 2016, which is based upon and claims the benefit of priority to Japan Priority Application No. 2015-197214, filed on Oct. 2, 2015, the disclosures of which are all hereby incorporated herein by reference in their entireties.

TECHNICAL FIELD

The present invention relates to an anti-counterfeiting structure for helping to prevent counterfeiting.

BACKGROUND ART

An information authentication medium such as a passport and an identification (ID) card contains information such as a facial image of an individual to be authenticated in order to enable visual authentication of the individual by use of the information authentication medium. Methods for adding information to the information authentication medium include laser-irradiating an allochroic layer provided with the information authentication medium (refer, for example, to PTL 1).

CITATION LIST

Patent Literature

[PTL 1] JPA2006-123174

SUMMARY OF THE INVENTION

Technical Problem

Information stored in an information authentication medium is on occasions falsified by rewriting of the information or by replacement of the part of the information authentication medium containing the information with a layer containing other information.

The information authentication medium is therefore desired to assume a structure that enables the medium itself to help prevent the same from being counterfeited by falsification of the information stored therein.

The present invention aims to provide an anti-counterfeiting structure that is capable of helping to prevent the falsification.

Solution to Problem

An anti-counterfeiting structure for solving the above problem includes an allochroic part having a characteristic of changing from a first material to a second material in response to laser irradiation, the allochroic part including a discolored part consisting only of the second material and having first information, and a foamable member having a characteristic of changing from an unfoamed state to a foamed state in response laser irradiation, the foamable member including a foamed part that contains second information, the second information being associated with the first information and constituting, together with the first information, an information group unique to the anti-counterfeiting structure, wherein, in a plan view of the discolored part and the foamed part, at least a part of the discolored part does not overlap with the foamed part.

The above configuration enables understanding from a discrepancy between an item of information and another item of information that the item of information has been falsified in the anti-counterfeiting structure. This is because the anti-counterfeiting structure contains an information group unique thereto. In other words, the configuration makes it difficult to falsify the information stored in the anti-counterfeiting structure without revealing that the information in the anti-counterfeiting structure has been falsified.

Compared with a configuration in which the discolored part and the foamed part are formed by, for example, a printed ink, the configuration also makes it difficult to falsify the first information and the second information because both the discolored part and the foamed part are parts of the anti-counterfeiting structure and parts that have denatured in response to laser irradiation.

In addition, compared with a configuration in which a whole of the discolored part overlaps with the foamed part, the configuration expands an area where the discolored part and the foamed part can be located because the discolored part and the foamed part have a part that does not overlap with each other in the plan view of the discolored part and the foamed part. As a result, falsifying the information stored in the anti-counterfeiting structure requires a falsifying manipulation over a larger area in the plan view of the already discolored part and the foamed part of the anti-counterfeiting structure.

This helps prevent the falsification in the anti-counterfeiting structure.

Advantageous Effects of the Invention

The present invention helps prevent the falsification of the anti-counterfeiting structure.

DESCRIPTION OF REPRESENTATIVE EMBODIMENTS

Described below are a first embodiment and a second embodiment in which an anti-counterfeiting structure are embodied. It is to be understood that these embodiments are intended to be representative of the present invention. The present invention is not necessarily limited to the embodiments. For convenience of description, the following contains a description of the first embodiment and the second embodiment, followed by description of a method of manufacturing an anti-counterfeiting structure that is common to the first and second embodiments.

First Embodiment

The anti-counterfeiting structure of the first embodiment will be described with reference to FIGS. 1 to 5. The constitution of the anti-counterfeiting structure and the method of laser irradiation will be hereinafter described sequentially.

[Constitution of the Anti-Counterfeiting Structure]

Figure 1:
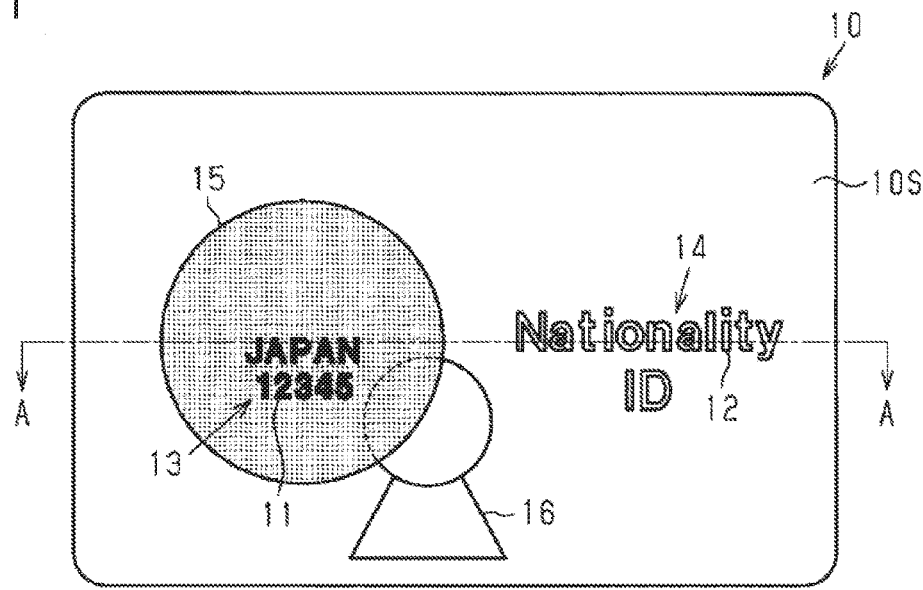
FIG. 1 is a plan view of an anti-counterfeiting structure according to a first embodiment.

A constitution of an anti-counterfeiting structure will be described with reference to FIGS. 1 to 3. As shown in FIG. 1, an anti-counterfeiting structure 10 includes a discolored part 11, and a foamed part 12. The discolored part 11 is included in an allochroic part having a characteristic of changing from a first material to a second material in response to laser irradiation. The discolored part 11 consists only of the second material and includes first information 13. A foamed part 12 is included in a foamable member having a characteristic of changing from an unfoamed, or pre-foamed, state to a foamed, or post-foamed, state in response to laser irradiation.

The foamed part 12 includes second information 14 that is associated with the first information 13 and constitutes a group of information unique to the anti-counterfeiting structure 10 together with the first information 13.

At least a part of the discolored part 11 may not overlap with the foamed part 12 in a plan view of the discolored part 11 and the foamed part 12. In the present embodiment, none of the discolored part 11 overlaps with a whole of the foamed part 12.

In a circumstance where an item of information is falsified in the anti-counterfeiting structure 10, a discrepancy between an item of information and another item of information indicates that an item of information has been falsified in the anti-counterfeiting structure 10 because the anti-counterfeiting structure 10 contains an information group unique thereto. In other words, it is difficult to falsify the information stored in the anti-counterfeiting structure 10 without revealing that the information in the anti-counterfeiting structure 10 has been falsified.

The discolored part 11 and the foamed part 12 are both a part of the anti-counterfeiting structure 10 and are also part that has denatured in response to laser irradiation. It is therefore difficult to falsify the first information 13 and the second information 14, compared with an occasion when the discolored part 11 and the foamed part 12 are printed.

In addition, compared with a configuration in which a whole of the discolored part 11 overlaps with the foamed part 12, the configuration expands an area where the discolored part 11 and the foamed part 12 can be located because the discolored part 11 and the foamed part 12 have a part that does not overlap with each other in the plan view of the discolored part 11 and the foamed part 12. As a result, falsifying the information stored in the anti-counterfeiting structure 10 requires a falsifying manipulation over a larger area in the plan view of the already discolored part 11 and the foamed part 12 of the anti-counterfeiting structure 10. This helps prevent the falsification in the anti-counterfeiting structure 10.

In addition, compared with a configuration in which a part of the first information 13 overlaps with the second information 14, each item of information tends to be visible because the first information 13 included in the discolored part 11 and the second information 14 included in the foamed part 12 do not overlap with each other in the plan view of the discolored part 11 and the foamed part 12.

A plurality of elements associated with one another constitutes one category. The first information 13 and the second information 14 represent, in representations different from each other, one of the pluralities of elements that belong to one category.

Examples of the category include a country name, an individual, and a region. On an occasion when the category is a country name, the category may include Japan, the United States, China, etc. as the plurality of elements. On an occasion when the category is an individual, the category may include, as the plurality of elements, a plurality of different individuals. On an occasion when the category is a region, the category may include Asia, Europe, North America, South America, Africa, etc. as the plurality of elements.

An information group consisting of the first information 13 and the second information 14 is any one combination of two different languages expressing one element, a character string and a figure, a character string and an image, and a character string and an identifier for the character string, etc. The first information 13 represents one of any of these combinations and the second information 14 represents the other, whereby the first information 13 and the second information 14 represent one element in representations different from each other.

In the present embodiment, the category containing the first information 13 and the second information 14 is a country name, where the first information 13 and the second information 14 represent "Japan", which is one element of the country names, in representations different from each other. The first information 13 is a character string "JAPAN", which is the English spelling of the country, while the second information 14 is "Nationality ID", which refers to "Japan" by an identifier unique to each country name. Specific identifiers corresponding to "Japan" are, incidentally, "JP" and "JPN" by way of example.

On an occasion when the category is a country name and the first information 13 and the second information 14 represent "Japan" in a representation different from each other, either of the first information 13 and the second information 14 may be a character string that represents "Japan", and the other may be an image of the national flag of Japan.

The first information 13 and the second information 14 may include other information as long as each of them includes information for representing one element in different representations. In the present embodiment, the first information 13 includes "JAPAN" as one element and a numeric string "12345" as another item of information.

Since the first information 13 and the second information 14 respectively represent a single element that belongs to a single category in a representation different from each other, a discrepancy between items of information, a discrepancy detected solely from the first information 13 and the second information 14, makes it possible to find out that the anti-counterfeiting structure has been falsified at a time when the first information 13 or the second information 14 is falsified.

Note that, on an occasion when the second information 14 is associated with the first information 13 and both the first information 13 and the second information 14 constitute an information group unique to the anti-counterfeiting structure 10, the first information 13 and the second information 14 may not necessarily represent a single element in a single category in a representation different from each other. The first information 13 and the second information 14 may represent a single element in a single category with an identical representation. In addition, either of the first information 13 and the second information 14 may be a serial number, a character or a character string containing at least one of a number and a character, and the other may be information associated with each serial number.

In such a configuration, using a database relating to an information group containing a serial number and information associated with each serial number makes it possible to find out whether a combination of the first information 13 and the second information 14 is authentic or either of the first information 13 and the second information 14 is falsified.

It should be noted that the information associated with the serial number may consist of at least one of a letter, a number, a symbol, a graphic, a predetermined image, etc.

In addition, either of the first information 13 and the second information 14 may include at least one of a letter, a number, a symbol, a figure, a predetermined image, etc., and the other may be a cipher associated with the information, a cipher for indicating that the information is authentic. The cipher may consist of at least one of a letter, a number, a graphic, etc.

In such a configuration, using a database relating to a combination of an item of information and a cipher associated with each item of information makes it possible to determine whether a combination of the first information 13 and the second information 14 is authentic or either of the first information 13 and the second information 14 is falsified.

The anti-counterfeiting structure 10 includes a device structure 15. The device structure 15 includes an optical device that displays third information in the plan view of the discolored part 11 and the foamed part 12. The device structure 15 overlaps with a whole of the discolored part 11 in the plan view of the discolored part 11 and the foamed part 12.

Preferably, the optical device is, for example, an optical variable device (OVD) and has a fine uneven structure. The OVD is an optical device that reproduces different third information for each direction in which the OVD is visually recognized, the third information being an image reproduced by the OVD. Examples of the optical device include a diffraction grating, a hologram, and a multilayer film.

In a configuration having the device structure 15 including an optical device, counterfeiting the anti-counterfeiting structure 10 requires counterfeiting not only of the discolored part 11 containing the first information 13 and the foamed part 12 containing the second information 14 but of the optical device as well. Compared with a configuration without an optical device, therefore, it is difficult to counterfeit the anti-counterfeiting structure 10, which can in turn hinder the counterfeiting of the anti-counterfeiting structure 10.

The anti-counterfeiting structure 10 includes another discolored part 16 that contains information different from the first information 13 and the second information 14. The discolored part 16 shows a predetermined image, such as a facial image, in the plan view of the discolored part 11 and the foamed part 12. Note that the discolored part 16 may be omitted.

Figure 2:
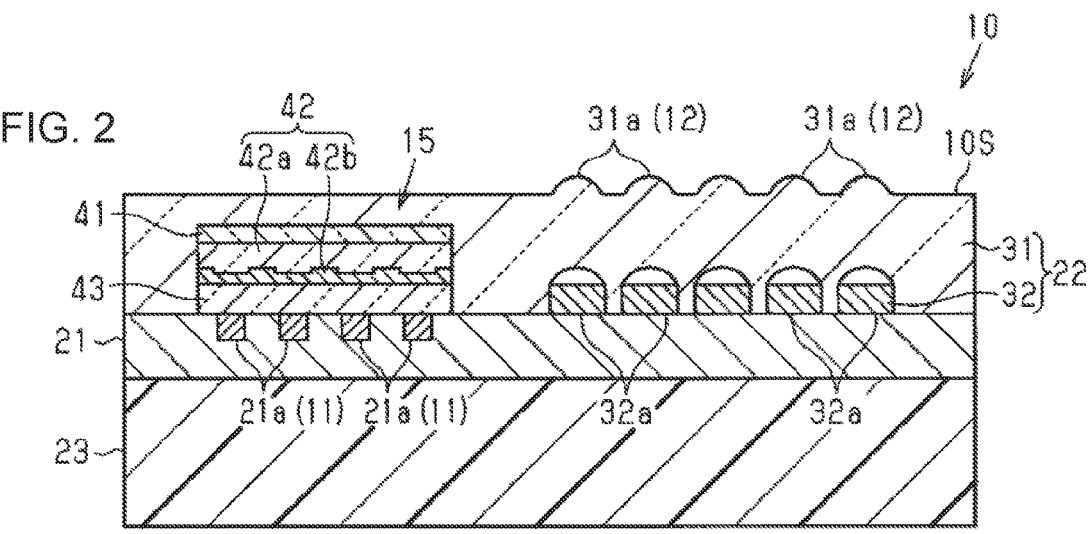
FIG. 2 is a cross-sectional view of the anti-counterfeiting structure taken along line A-A of FIG. 1.

FIG. 2 is a view of a cross-sectional structure taken along line A-A shown in FIG. 1. Note that, in FIG. 2, for convenience of illustration, fewer discolored parts and promoting parts are shown than in FIG. 1, and the sizes of these parts are exaggerated.

As shown in FIG. 2, the anti-counterfeiting structure 10 includes a layered allochroic layer 21, an example of an allochroic member, and a layered foamable layer 22, an example of a foamable member. As described above, the allochroic layer 21 has a characteristic of changing from the first material to the second material in response to laser irradiation, and includes a discolored part 11 consisting only of the second material. The discolored part 11 consists of a plurality of discolored parts 21a. The allochroic layer 21 has a characteristic of changing from the first material having a first color to the second material having a second color in response to laser irradiation. In other words, the allochroic layer 21 has a characteristic of discoloring in response to laser irradiation.

Carbonizing the first material forming the allochroic layer 21 to provide the second material can form a discolored part 11 in the allochroic layer 21. In other words, carbonization of the allochroic layer 21 caused by the laser irradiation discolors the allochroic layer 21 from a first color, or a pre-irradiated color, to a second color, or a post-irradiated color. On this occasion, the allochroic layer 21 preferably contains material that is absorbent of a laser beam. A pigment is sufficient as the material.

In a circumstance where the first material forming the allochroic layer 21 contains a pigment, variation in a crystal structure of a metal ion in the pigment or a hydration amount in the metal ion crystal caused by the laser irradiation changes the first material into the second material. A chemical change in such a pigment forms a discolored part 11 in the allochroic layer 21. In other words, a chemical change in the pigment caused by the laser irradiation discolors the allochroic layer 21 from the first color, or the pre-irradiated color, to the second color, or the post-irradiated allochroic layer color.

The first material forming the allochroic layer 21 may contain a resin and a pigment. In a circumstance where the allochroic layer 21 contains a pigment, laser-irradiating the part of the allochroic layer 21 increases a molecular density of the pigment in the irradiated part thereof, where the pigment is more concentrated than in another part of the allochroic layer 21. The laser-irradiated part of the allochroic layer 21 changes into the second material whose color is denser than in the part of the allochroic layer 21 that is not laser-irradiated. In other words, the condensation in the pigment caused by the laser irradiation discolors the allochroic layer 21 from a first color, or a less dense color, to a second color, or a denser color.

The first material forming the allochroic layer 21 may also contain a dye. In a circumstance where the allochroic layer 21 contains a dye, laser-irradiating the part of the allochroic layer 21 decomposes and decolorizes the dye in the irradiated part thereof, compared with another part of the allochroic layer 21. This changes the first material into the second material. The laser-irradiated discolored part 11 of the allochroic layer 21 changes into the second material whose color is less dense than in the part of the allochroic layer 21 that is not laser-irradiated. In other words, the decoloration of the dye caused by the laser irradiation discolors the allochroic layer 21 from the first color, a denser color, to the second color, a less dense color.

In the present embodiment, the whole of the allochroic layer 21 is an allochroic part, but only a part corresponding to the discolored part 11 at least in a pre-irradiated allochroic layer 21 needs to have a characteristic of changing from the first material to the second material.

The foamable layer 22 includes the foamed part 12 and covers the allochroic layer 21. As described above, the foamable layer 22 has a characteristic of changing from an unfoamed state to a foamed state in response to laser irradiation. The foamable layer 22 consists of a foamable member 31 and a foam-promoting unit 32, and the foamable member 31 covers the foam-promoting unit 32 and the allochroic layer 21.

The foamable member 31 has a surface 10S, which is transparent to a laser beam and serves as a surface opposite to the surface that is in contact with the allochroic layer 21. The foam-promoting unit 32 overlaps with the foamed part 12 in a plan view of the surface 10S, and has a characteristic of promoting a part of the foamable member 31 to foam by virtue of laser irradiation, a part corresponding to a foamed part 12 that has not foamed yet.

At a time when an operation of removing at least a part of the foamable member 31 from the allochroic layer 21 is carried out on the anti-counterfeiting structure 10 in an attempt to falsify the anti-counterfeiting structure 10, the foamed part 12 may on occasions deform because the allochroic layer 21 is covered by the foamable member 31 in the anti-counterfeiting structure 10. The deformation of the foamed part 12 makes it possible to determine whether the anti-counterfeiting structure 10 has been falsified.

Compared with a configuration in which a part containing the first information 13 and a part containing the second information 14 are respectively formed by virtue of different method, this configuration makes it easier to manufacture the anti-counterfeiting structure 10 because the discolored part 11 and the foamed part 12 can both be formed by laser irradiation.

In addition, this configuration makes it possible to retain information relating to an information group unique to the anti-counterfeiting structure 10 in a laser printing device because the discolored part 11 and the foamed part 12 can be formed by use of a single laser. Managing only the single laser printing device, therefore, can help prevent information related to the information group unique to the anti-counterfeiting structure 10 from leaking outside. As a result, information leakage can be reduced compared with an occasion when information on an information group is retained in a plurality of devices.

The foamed part 12 of the foamable member 31 consists of a plurality of foamed parts 31a. In addition, the foam-promoting unit 32 consists of a plurality of promoting portions 32a.

In a part of the foamable member 31 where the foamed part 31a is formed, a gas produced by foaming of the foamable member 31 is present between the promoting portion 32a and the foamed part 31a, thereby forming space between the promoting portion 32a and the foamed part 31a. A part of the surface 10S included in the foamed part 31a, therefore, protrudes in a direction away from the allochroic layer 21 by a thickness of the space formed between the promoting portion 32a and the foamed part 31a, compared with another part of the surface 10S.

This enables a user of the anti-counterfeiting structure 10 to confirm that the foamed part 12 is formed in the anti-counterfeiting structure 10 through touching the foamed part 12 forming the surface 10S.

The device structure 15 including an optical device is present in a part of the allochroic layer 21, part where the foam-promoting unit 32 is not located in a plan view of the surface 10S, and is covered with the foamable member 31.

At a time of removal of the optical device and the foamable layer 22 from the allochroic layer 21 to falsify the anti-counterfeiting structure 10 by separation of the optical device and the foamable layer 22 from the allochroic layer 21, therefore, the foamed part 12 may on occasions deform. Even on an occasion when the optical device and the foamable layer 22 are bonded to the allochroic layer 21 having falsified information, the deformation of the foamed part 12 makes it possible to determine that a falsifying operation was carried out on the anti-counterfeiting structure 10.

The device structure 15 includes a peelable layer 41, an optical device 42, and an adhesive layer 43. The adhesive layer 43 is adhered to a part of the allochroic layer 21. The device structure 15 is transmissive to a laser beam.

On an occasion when the optical device 42 is a diffraction grating or a hologram, the optical device 42 includes a forming member 42a and an amplifying part 42b. The forming member 42a is a member for forming an uneven structure in the optical device 42, a surface thereof on a side opposite to a surface that is in contact with the peelable layer 41 being a relief surface having a fine uneven pattern. The amplifying part 42b amplifies an optical effect of the optical device and covers the relief surface of the forming member 42a.

The anti-counterfeiting structure 10 includes a base material 23 that supports the allochroic layer 21 and the foamable layer 22, the base material 23 being in contact with a surface of the allochroic layer 21 on a side opposite to a side being in contact with the foamable layer 22.

Figure 3:
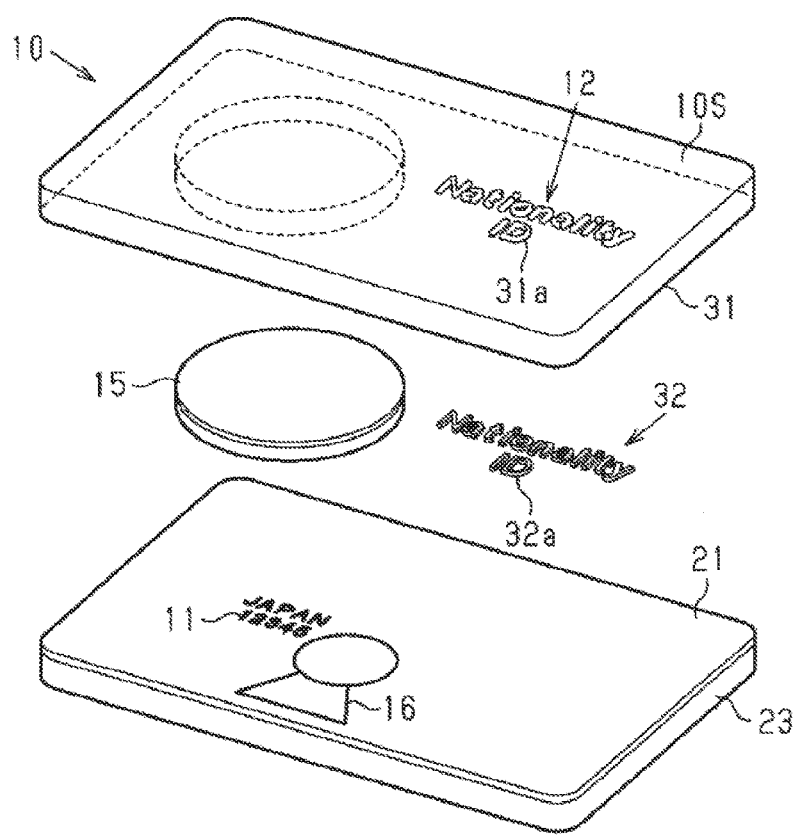
FIG. 3 is an exploded perspective view of the anti-counterfeiting structure, with its components disassembled.

As shown in FIG. 3, the foam-promoting unit 32 consists of a plurality of promoting portions 32a. In the plan view of the surface 10S, the promoting portions 32a overlap with different foamed parts 31a.

Each foamed part 31a is formed in response to laser irradiation of the promoting portion 32a with which the foamed part 31a overlaps because each promoting portion 32a overlaps with a single foamed part 31a in the plan view of the surface 10S. Thus an area of the foamable member 31 where the foamed part 31a is formed is unlikely to spread around part where the foamed part 31a should be formed. This achieves more a precise shape of the foamed part 12, and in turn of the second information 14 included in the foamed part 12.

[Laser Irradiation Method]

Figure 4:
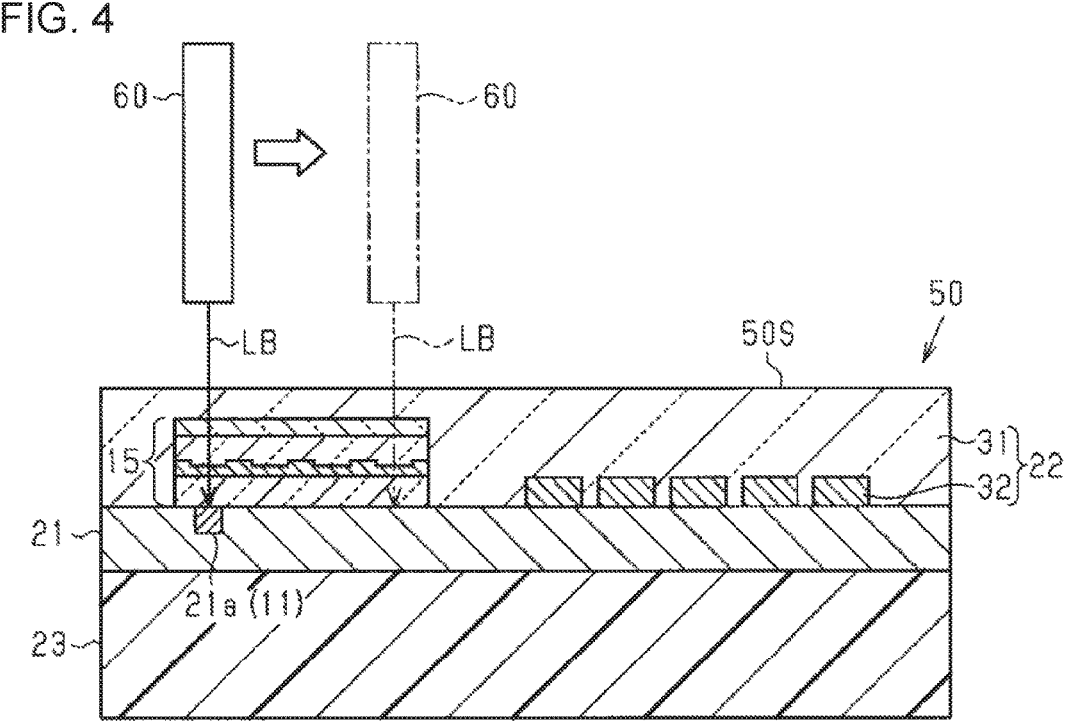
FIG. 4 illustrates a process of irradiating an allochroic layer of a laminate with a laser beam.
Figure 5:
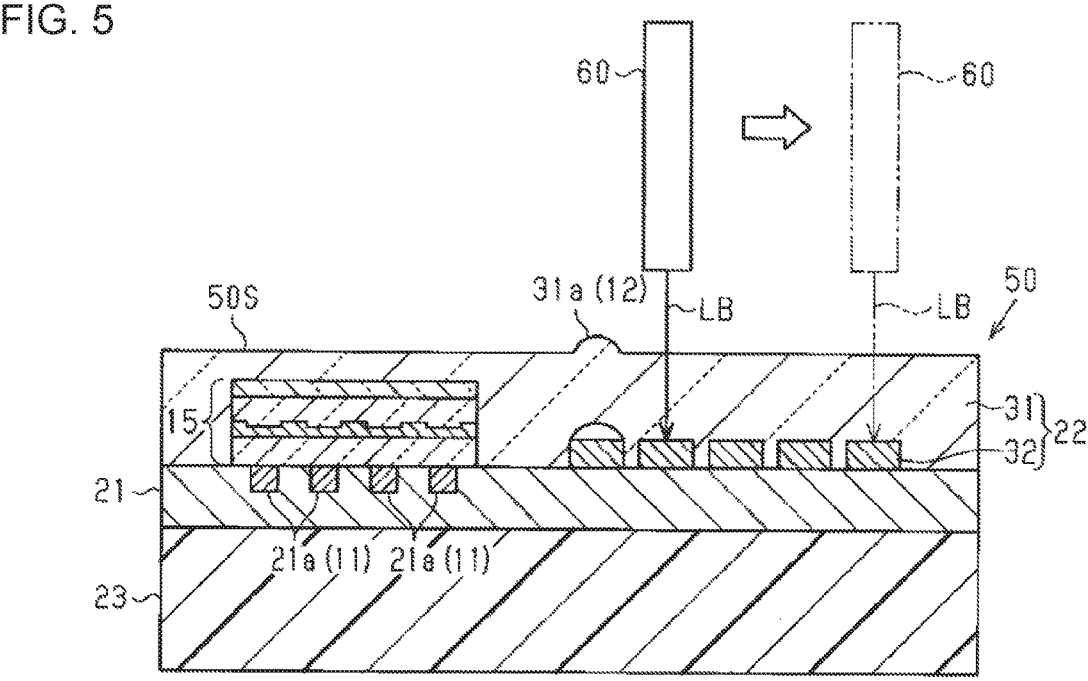
FIG. 5 illustrates a process of irradiating a foam-promoting unit of the laminate with a laser beam.

With reference to FIGS. 4 and 5, a description will be given of a method of laser-irradiating a laminate, which is an anti-counterfeiting structure 10 where the discolored part 11 and the foamed part 12 have not been formed. In the following description, a method of applying a laser beam for forming the discolored part 11 in the allochroic layer 21 of the laminate will be described first, followed by applying a laser beam for causing a predetermined part of the foamable layer 22 to foam, as an example of an irradiation method.

During laser irradiation of the laminate, however, the irradiation for causing the predetermined part of the foamable layer 22 to foam may be carried out before the irradiation for forming the discolored part 11 in the allochroic layer 21. Alternatively, the irradiation for forming the discolored part 11 in the allochroic layer 21 and the irradiation for causing the predetermined part of the foamable layer 22 to foam may be carried out almost simultaneously.

The following description contains an example in which laser-irradiation of the laminate is performed with respect to the foamable layer 22 from a side opposite to the base material 23, but the laminate may be laser-irradiated from a side opposite to the foamable layer 22 relative to the base material 23.

As shown in FIG. 4, a laminate 50 in which the discolored part 11 and the foamed part 12 are not formed has the base material 23, the allochroic layer 21, and the foamable layer 22. The foamable layer 22 consists of the foamable member 31 and the foam-promoting unit 32, and the foamable member 31 covers the device structure 15, which is located on the allochroic layer 21, and foam-promoting unit 32. The laminate 50 has a surface 50S, which corresponds to the surface 10S of the anti-counterfeiting structure 10.

First, the laminate 50 is laser-irradiated to form the discolored part 11 in the allochroic layer 21. At this time, a part of the allochroic layer 21 that overlaps with the surface 50S and a part of the allochroic layer 21 that does not overlap with either of the device structure 15 or the foam-promoting unit 32 in a plan view of the surface 50S are respectively laser-irradiated.

The energy of a laser beam LB emitted by a laser 60 is set to a level at which energy that is large enough to discolor the allochroic layer 21 reaches the allochroic layer 21. In other words, the energy of the laser beam LB is set to a level at which energy that is large enough to change a first material forming the allochroic layer 21 to a second material reaches the allochroic layer 21.

In addition, the energy level of the laser beam LB and a position of a focal point thereof are set to help prevent each of the layers other than the allochroic layer 21, the layers through which the laser beam LB passes, i.e., each layer constituting the device structure 15 and the foamable member 31, from discoloring or foaming. These settings discolor only the part of the laminate 50 irradiated with the laser beam LB in the allochroic layer 21.

As described above with reference to FIGS. 1 and 2, the discolored part 11 containing the first information 13 and the discolored part 16 containing other information are thus formed in the allochroic layer 21.

Then, as shown in FIG. 5, the laminate 50 is irradiated with the laser beam LB to cause a predetermined portion of the foamable layer 22 to foam. At this time, the foam-promoting unit 32, of the laminate 50, which is included in predetermined part and part around the foam-promoting unit 32 thereof in the plan view of the surface 50S are irradiated with the laser beam LB by use of a laser 60.

The energy of the laser beam LB emitted by the laser 60 is set to a level at which the part of the foamable member 31 that overlaps with the foam-promoting unit 32 can foam in the plan view of the surface 50S. In other words, the energy of the laser beam LB is set to a level at which energy that reaches the foam-promoting unit 32 is large enough to change an unfoamed part of the foamable member 31 to a foamed state.

In addition, the energy of the laser beam LB and the position of the focal point thereof are set to a level at which energy that is large enough to discolor the allochroic layer 21 will not reach the allochroic layer 21.

This helps prevent the allochroic layer 21 from discoloring even if the foam-promoting unit 32, of the laminate 50, which is included in the predetermined part, and the part around the foam-promoting unit 32 in the plan view of the surface 50S are irradiated with the laser beam LB.

On the other hand, compared with an occasion when only the part where the foam-promoting unit 32 of the laminate 50 is located in the plan view of the surface 50S is irradiated with the laser beam LB, the whole of the part of the foamable member 31 that overlaps with the foam-promoting unit 32 easily foams in the plan view of the surface 50S.

As described above with reference to FIGS. 1 and 2, the foamed part 12 containing the second information 14 is thus formed in the foamable member 31.

As described above, the first embodiment of the anti-counterfeiting structure can achieve the following effects.

(1) In a circumstance where an item of information is falsified in the anti-counterfeiting structure 10, a discrepancy between an item of information and another item of information indicates that an item of information has been falsified in the anti-counterfeiting structure 10 because the anti-counterfeiting structure 10 contains an information group unique thereto. In other words, it is difficult to falsify the information stored in the anti-counterfeiting structure 10 without revealing that the information in the anti-counterfeiting structure 10 has been falsified.

(2) Compared with a configuration in which the discolored part 11 and the foamed portion 12 are printed, the configuration also makes it difficult to falsify the first information 13 and the second information 14 because both the discolored part 11 and the foamed portion 12 are parts of the anti-counterfeiting structure 10 and parts that have denatured in response to the irradiation with the laser beam LB.

(3) Compared with a configuration in which a whole of the discolored part 11 overlaps with the foamed part 12, the configuration expands an area where the discolored part 11 and the foamed part 12 can be located because the discolored part 11 and the foamed part 12 have a part that does not overlap with each other in the plan view of the discolored part 11 and the foamed part 12. As a result, falsifying the information stored in the anti-counterfeiting structure 10 requires a falsifying manipulation over a larger area in the plan view of the already discolored part 11 and the foamed part 12 of the anti-counterfeiting structure 10.

(4) Compared with a configuration in which a part of the first information 13 overlaps with the second information 14, each item of information is visible because the first information 13 stored in the discolored part 11 and the second information 14 stored in the foamed part 12 do not overlap with each other in the plan view of the surface 10S.

(5) Since the first information 13 and the second information 14 respectively represent one element that belongs to one category in a representation different from each other, a discrepancy between items of information, a discrepancy detected solely from the first information 13 and the second information 14, makes it possible to find out that the anti-counterfeiting structure 10 has been falsified at a time when the first information 13 or the second information 14 is falsified.

(6) At a time when an operation of removing at least a part of the foamable member 31 from the allochroic layer 21 is carried out on the anti-counterfeiting structure 10 in an attempt to falsify the anti-counterfeiting structure 10, the foamed part 12 may on occasions deform because the allochroic layer 21 is covered by the foamable member 31. The deformation of the foamed part 12 makes it possible to determine whether the anti-counterfeiting structure 10 has been falsified.

(7) Each foamed part 31a is formed in response to irradiation, with the laser beam LB, of the promoting portion 32a with which the foamed part 31a overlaps because each promoting portion 32a overlaps with a single foamed part 31a in the plan view of the surface 10S. A region of the foamable member 31 where the foamed part 31a is formed thus is unlikely to spread around part where the foamed part 31a should be formed. This achieves a more precise shape of the foamed part 12, and in turn of the second information 14 included in the foamed part 12.

(8) Counterfeiting the anti-counterfeiting structure 10 requires counterfeiting of the optical device 42 as well as the first information 13 and the second information 14 because the anti-counterfeiting structure 10 includes the optical device 42. Compared with a configuration without an optical device 42, therefore, it is difficult to counterfeit the anti-counterfeiting structure 10, which can in turn hinder the counterfeiting of the anti-counterfeiting structure 10.

(9) On an occasion of removal of the optical device 42 and the foamable layer 22 from the allochroic layer 21 to falsify the anti-counterfeiting structure 10, the foamed part 31a in the foamable member 31 may on occasions deform. The deformation of the foamed part 12, therefore, makes it possible to determine that a falsifying operation was carried out on the anti-counterfeiting structure 10 even if the optical device 42 and the foamable layer 22 are bonded to the allochroic layer 21 having falsified information.

Note that the first embodiment described above can also be implemented by the appropriate modifications described below.

The optical device 42 is not limited to the OVD described above, but may be another optical device. The optical device 42 may also be a device that reflects light incident on the optical device 42, a device that emits light incident on the optical device 42 as scattered light, a device that emits light incident on the optical device 42 after converting its color into a different color, a device that helps prevent light incident on the optical device 42 from reflecting, or the like.

As long as the allochroic layer 21 is transmissible to the third information represented by the optical device 42, the optical device 42 may be located on a surface of the allochroic layer 21 opposite to a surface thereof that is in contact with the foamable layer 22, and may be sandwiched between the allochroic layer 21 and the base material 23 in a thickness direction of the anti-counterfeiting structure 10. In addition, the optical device 42 may be located on a surface of the base material 23 opposite to a surface thereof that is in contact with the allochroic layer 21 as long as the allochroic layer 21 and the base material 23 are transmissive to the third information. Alternatively, the optical device 42 may be located on a surface of the foamable layer 22 opposite to a surface thereof that is in contact with the allochroic layer 21, and may constitute the surface 10S together with the foamable layer 22. The optical device 42 is preferably located between two layers constituting the anti-counterfeiting structure 10 in terms of helping prevent the optical device 42 from being removed from the anti-counterfeiting structure 10.

The device structure 15 may overlap only with a part of the allochroic part 11. The device structure 15 may overlap with at least a part of the foamed part 12 in the plan view of the surface 10S, may not overlap with any of the discolored part 11 and the foamed part 12, and may overlap with both a part of the allochroic part 11 and a part of the foamed part 12.

The foam-promoting unit 32 may also consist of a single promoting portion 32a. In such a configuration, the foam-promoting unit may be patterned into a predetermined shape or may not be patterned. In a configuration in which the foam-promoting unit is patterned, irradiating the foam-promoting unit with a laser beam can form the foamed part 12 with a predetermined shape. In a configuration in which the foam-promoting unit is not patterned, irradiating the foam-promoting unit with a laser beam along a predetermined shape can still form the foamed part 12 with the predetermined shape.

The foamable layer 22 may not cover the allochroic layer 21. The foamable layer 22 and the allochroic layer 21 may be disposed at locations different from each other on the base material 23 in the plan view of the discolored part 11 and the foamed part 12. In such a configuration, each of the foamable layer 22 and the allochroic layer 21 may include a part of the surface 10S. The anti-counterfeiting structure 10 may further include another layer that covers the foamable layer 22 and the allochroic layer 21. This other layer may include the surface 10S of the anti-counterfeiting structure 10.

In the foamable layer 22, the foamable member 31 and the foam-promoting unit 32 may be integrally formed. In other words, the foamable layer 22 may be formed of a mixture of a material acting as the foamable member 31 and a material acting as the foam-promoting unit 32. Alternatively, the foamable layer 22 may be formed of a single material having a characteristic of changing from an unfoamed state to a foamed state in response to laser irradiation.

In the configuration in which the foamable member 31 and the foam-promoting unit 32 are integrally formed in the foamable layer 22, the foamable layer 22 may cover the allochroic layer 21. Alternatively, the foamable layer 22 may not cover the allochroic layer 21. The foamable layer 22 and the allochroic layer 21 may be respectively disposed at a location different from each other in the plan view of the discolored part 11 and the foamed part 12. In such a configuration, each of the foamable layer 22 and the allochroic layer 21 may include a part of the surface 10S. The anti-counterfeiting structure 10 may further include another layer that covers the foamable layer 22 and the allochroic layer 21. This other layer may include the surface 10S of the anti-counterfeiting structure 10.

Figure 6:
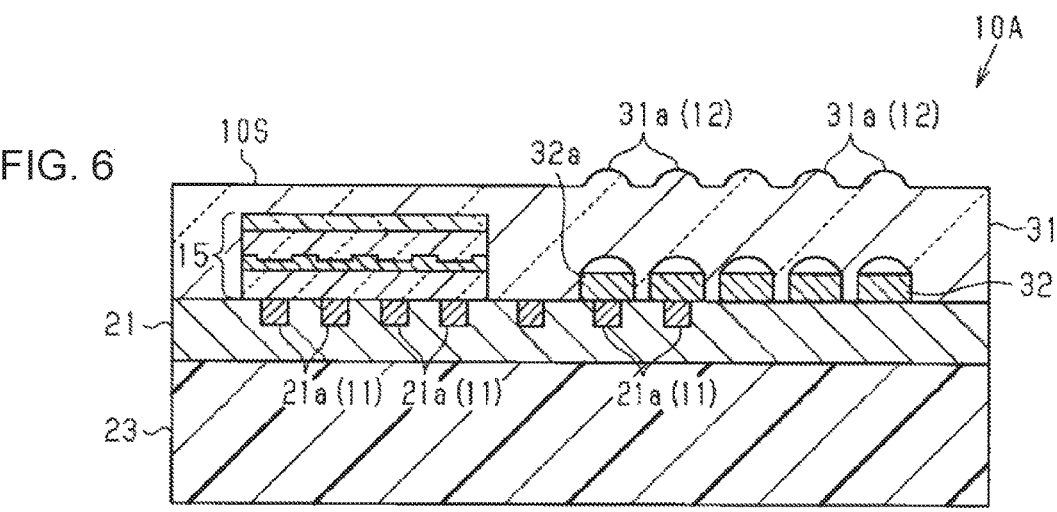
FIG. 6 is a cross-sectional view of an anti-counterfeiting structure according to a modification.

As shown in FIG. 6, a part of the discolored part 11 and a part of the foamed part 12 may overlap with each other in the plan view of the surface 10S. In other words, the foam-promoting unit 32 is located at a location on one surface of the allochroic layer 21 in the anti-counterfeiting structure 10A, a location different from that of the device structure 15. Some of the plurality of discolored parts 21a constituting the discolored part 11 overlap with the promoting portion 32a and the foamed part 31a in the plan view of the surface 10S.

Even in such a configuration, an effect similar to the above (1) can still be achieved as long as the anti-counterfeiting structure 10A includes the discolored part 11 containing the first information 13 and the foamed part 12 containing the second information 14 that is associated with the first information 13 and that constitutes, together with the first information 13, an information group unique to the anti-counterfeiting structure 10A.

Figure 7:
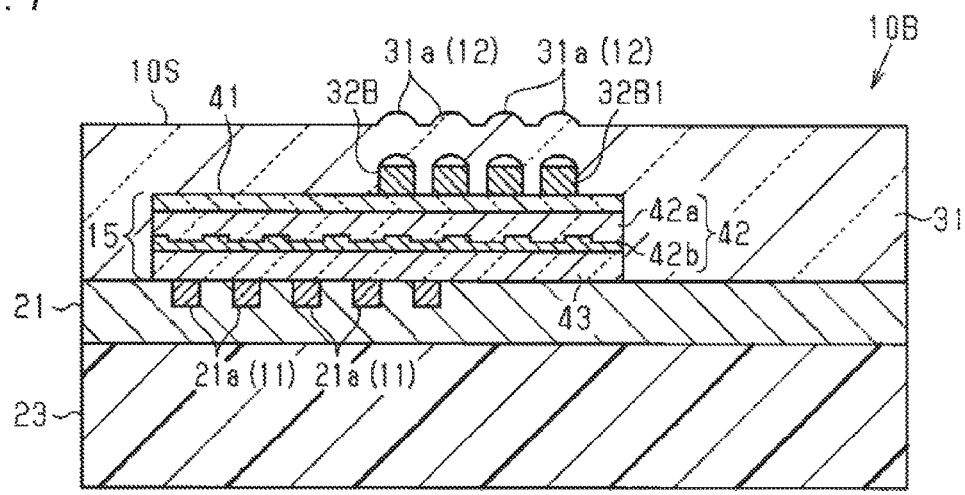
FIG. 7 is a cross-sectional view of an anti-counterfeiting structure according to a modification.

As shown in FIG. 7, the configuration in which a part of the discolored part 11 and a part of the foamed part 12 may overlap with each other in the plan view of the surface 10S may be the configuration described below. In other words, a foam-promoting unit 32B is located on a surface of a peelable layer 41 opposite to a surface thereof that is in contact with the optical device 42 in an anti-counterfeiting structural body 10B. The foamable member 31 covers the device structure 15 and the foam-promoting unit 32B.

Some of the pluralities of discolored parts 21a that constitute the discolored part 11 overlap with a promoting portion 32B1 and the foamed part 31a in the plan view of the surface 10S.

Even in such a configuration, an effect similar to the above (1) can still be achieved as long as the anti-counterfeiting structure 10B includes the discolored part 11 containing the first information 13 and the foamed part 12 containing the second information 14 that is associated with the first information 13 and that constitutes, together with the first information 13, an information group unique to the anti-counterfeiting structure 10B.

In addition to the fine uneven structure that acts as the diffraction grating and hologram described above, the forming member 42a of the optical device 42 may have another uneven structure corresponding to at least one of a letter, a number, and a graphic. In such a configuration, the third information stored in the optical device 42 includes information corresponding to the other uneven structure.

The anti-counterfeiting structure 10 may not necessarily include the base material 23 in a circumstance where the allochroic layer 21 can support the device structure 15 and the foam-promoting unit 32 while the anti-counterfeiting structure 10 is in use, or where these can be supported by a member other than the anti-counterfeiting structure 15.

The anti-counterfeiting structure 10 can be used as an authentication medium. The authentication medium can be used to authenticate an individual carrying an ID card, a passport, a visa, etc., or to authenticate an ID tag and other article or an organism.

Second Embodiment

The anti-counterfeiting structure of the second embodiment will be described with reference to FIGS. 8 to 11. The anti-counterfeiting structure of the second embodiment differs from the anti-counterfeiting structure of the first embodiment in that the former includes another discolored part in the allochroic layer. The following description refers to such a difference in detail, and omits a detailed description of configuration in the anti-counterfeiting structure of the second embodiment that is common to the anti-counterfeiting structure of the first embodiment by reference to the configuration with an identical reference numeral. A configuration and mechanism of the anti-counterfeiting structure will be described sequentially in the following description.

[Configuration of the Anti-Counterfeiting Structure]

Figure 8:
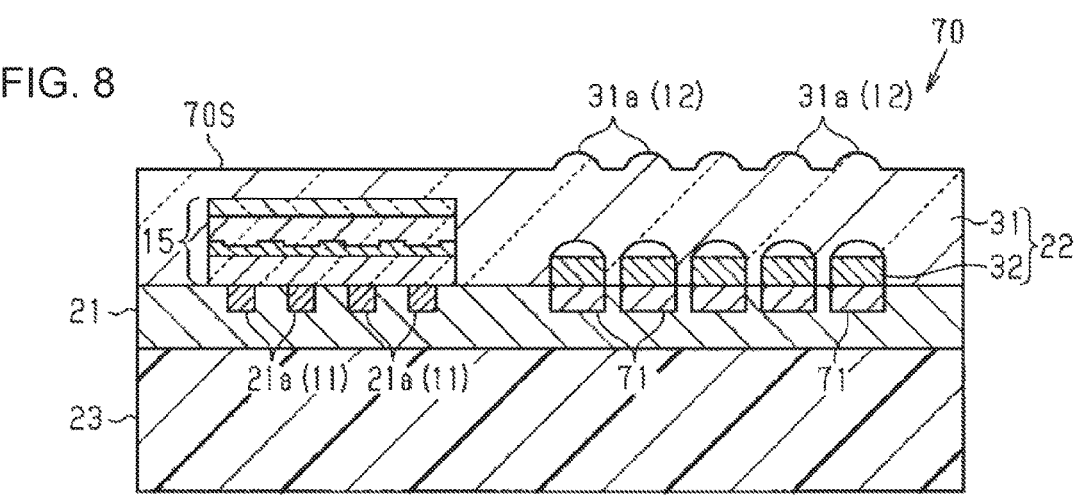
FIG. 8 is a cross-sectional view of an anti-counterfeiting structure according to a second embodiment.

As shown in FIG. 8, an anti-counterfeiting structure 70 includes a discolored part 71 in a part of the allochroic layer 21 that overlaps with the foam-promoting unit 32 in a plan view of a surface 70S of the anti-counterfeiting structure 70. The foam-promoting unit 32 of the anti-counterfeiting structure 70 is transmissive to a laser beam.

Figure 9:
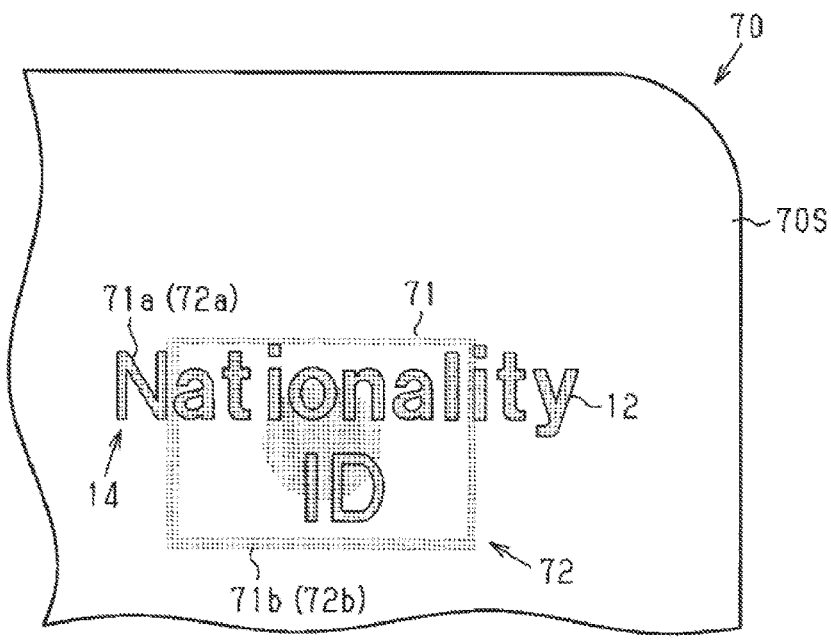
FIG. 9 is an enlarged partial plan view of the anti-counterfeiting structure.

As shown in FIG. 9, the discolored part 71 consists of a first portion 71a and a second portion 71b. The first portion 71a overlaps with the foamed part 12 in the plan view of the surface 70S. The discolored part 71 contains fourth information 72.

The fourth information 72 consists of a first portion 72a and a second portion 72b, the first portion 72a overlapping with a whole of the second information 14 and the second portion 72b not substantially overlapping with the second information 14 in the plan view of the surface 70S. In other words, the first portion 72a of the fourth information 72 is included in the first portion 71a of the discolored part 71, while the second portion 72b of the fourth information 72 is included in the second portion 71b of the discolored part 71.

Figure 10:
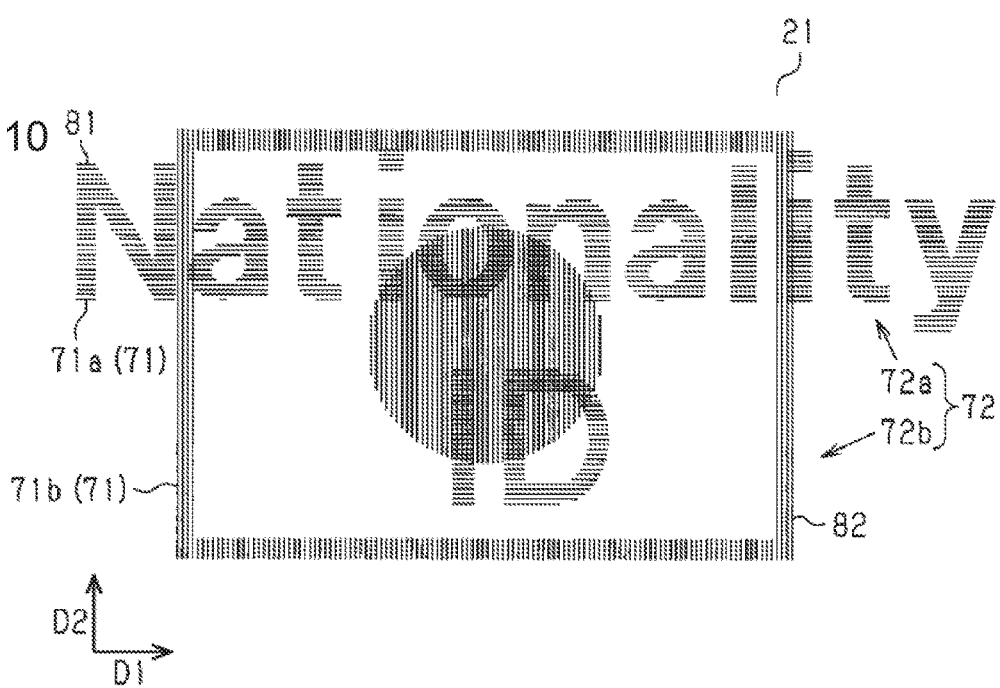
FIG. 10 is an enlarged plan view of a discolored part formed in an allochroic layer.

FIG. 10 is a plan view of the allochroic layer 21 viewed in a line-of-sight direction parallel to a normal direction of the surface 70S, illustrating the structure of an area of the allochroic layer 21 where the discolored part 71 is formed. Note that, in FIG. 10, the thickness of each of a first line and a second line, a gap formed between the two first lines, and a gap formed between the two second lines are exaggerated for convenience of illustration.

As shown in FIG. 10, the first portion 71a of the discolored part 71 formed in the allochroic layer 21 consists of a plurality of first lines 81, and the second portion 71b consists of a plurality of second lines 82. Each of the first lines 81 linearly extends along a first direction D1, while each of the second lines 82 linearly extends along a second direction D2, which is orthogonal to the first direction. Note that the first direction D1 and the second direction D2 may intersect each other at an angle other than a right angle.

In the first portion 71a, a plurality of the first lines 81 are arranged along the second direction D2. A width along the second direction D2 of each first line 81 and a distance along the second direction D2 between mutually adjacent first lines 81 are preferably set such that approximately 3 to 10 first lines 81 are arranged per 1 mm.

In the second portion 71b, a plurality of the second lines 82 are arranged along the first direction D1. A width along the first direction D1 of each second line 82 and a distance along the first direction D1 between mutually adjacent second lines 82 are preferably set such that approximately 3 to 10 second lines 82 are arranged per 1 mm.

The width of the second line 82 along the first direction D1 is preferably equal to the width of the first line 81 along the second direction D2. The distance between two second lines 82 in the first direction D1 is preferably equal to the distance between two first lines 81 in the second direction D2. In such a configuration, the fourth information 72 is visually recognized as a single image more reliably at a time when the anti-counterfeiting structure 70 is visually recognized from the line-of-sight direction parallel to the normal direction of the surface 70S.

Among the first portion 72a and the second portion 72b, both of which constitute the fourth information 72, the first portion 72a is "Nationality ID" and overlaps with the second information 14 in the plan view of the surface 70S. The second part 72b is an image representing the national flag of Japan, and a part of the second part 72b overlaps with a part of the first part 72a.

[Laser Irradiation Method]

At a time of manufacturing of the anti-counterfeiting structure 70 of the second embodiment, laser irradiation for forming the discolored part 71 is carried out on the laminate 50 described above, as well as laser irradiation for forming the discolored part 11 and for causing a predetermined part of the foamable layer 22 to foam.

The laser irradiation for forming the allochroic part 11, the laser irradiation for causing the predetermined part of the foamable layer 22 to foam, and the laser irradiation for forming the discolored part 71 can be carried out in any order. In addition, these occasions of laser irradiation can be carried out almost simultaneously.

The energy of the laser beam LB emitted by the laser 60 to form the discolored part 71 is set to a level at which energy that is large enough to discolor the allochroic layer 21 can reach the allochroic layer 21.

In addition, the energy level of the laser beam LB and the position of the focal point thereof are set to help prevent each of the layers other than the allochroic layer 21, the layers through which the laser beam LB passes, i.e., each portion constituting the foamable layer 22, from discoloring or foaming. These settings discolor only the part of the laminate 50 irradiated with the laser beam LB in the allochroic layer 21. As described above with reference to FIG. 8, the discolored part 71 including the fourth information 72 is thus formed in the allochroic layer 21.

[Mechanism of the Anti-Counterfeiting Structure]

Figure 11:
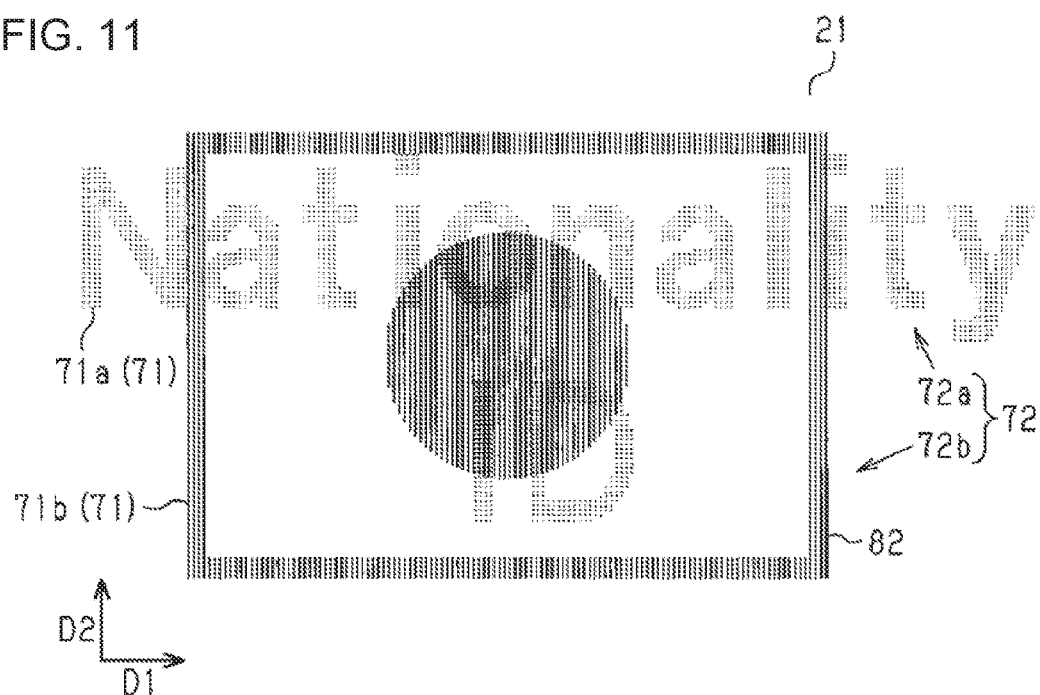
FIG. 11 illustrates the mechanism of the discolored part.

The mechanism of the anti-counterfeiting structure 70 will be described with reference to FIGS. 10 and 11. As shown in FIG. 10, when the anti-counterfeiting structure 70 is visually recognized from the line-of-sight direction parallel to the normal direction of the surface 70S, the fourth information 72 is visually recognized as a single image consisting of the first portion 72a and the second portion 72b because the first portion 71a and the second portion 71b in the discolored part 71 are almost visually indistinguishable.

A viewing angle is an angle formed by a line-of-sight direction and a surface in a plane including the line-of-sight direction, the plane orthogonal to the surface 70S of the anti-counterfeiting structure 70. An initial angle is a viewing angle at which the first portion 71a and the second portion 71b of the discolored part 71 are almost visually indistinguishable.

The anti-counterfeiting structure 70 is tilted relative to the line-of-sight direction such that the line-of-sight angle changes from the initial angle. This causes the distance between the two first lines 81 in the second direction D2 to be visually recognized as a distance significantly different from the distance between the two second lines 82 in the first direction D1. As a result, as shown in FIG. 11, the first portion 71a and the second portion 71b of the discolored part 71 are visually distinguished, so that the second portion 72b of the fourth information 72 is visually recognized distinguishably from the first portion 72a.

While the second portion 72b included in the fourth information 72 is invisible, as described above, at a time when it is visually recognized at the initial angle, it becomes visible at a time when the viewing angle changes from the initial angle.

In contrast, the first portion 72a included in the fourth information 72 is always visually recognized in overlap with the second information 14 regardless of the angle formed by the surface 70S and the line-of-sight direction because it always overlaps with the second information 14 in the plan view of the surface 70S.

As described above, the second embodiment of the anti-counterfeiting structure can not only achieve the effects (1) to (9) listed above but the following effects as well.

(10) The authenticity of the anti-counterfeiting structure 70 can be determined depending on whether the anti-counterfeiting structure 70 includes the second portion 72b that becomes visible at the time when it is viewed at a viewing angle different from the initial angle.

(11) It is hard to counterfeit the anti-counterfeiting structure 70, compared with an occasion when the anti-counterfeiting structure 70 do not include the discolored part 71, because counterfeiting the anti-counterfeiting structure 70 requires counterfeiting of the discolored part 71 constituted by the first portion 71a and the second portion 71b as well.

Note that the second embodiment described above can also be implemented by the appropriate modifications described below. The discolored part 71 may be formed at a location that does not overlap with the foamed part 12 of the allochroic layer 21 in the plan view of the surface 70S.

The fourth information 72 may include information different from the second information 14 as the first part 72a. In addition, the first portion 72a and the second portion 72b may be identical information in the fourth information 72. Even such a configuration can still achieve an effect similar to (10) and (11) listed above by virtue of a change in the viewing angle from the initial angle as long as the fourth information 72 is viewed differently.

[Method of Manufacturing the Anti-Counterfeiting Structure]

A method of manufacturing the anti-counterfeiting structure will be described with reference to FIGS. 12 to 16. The following description refers to steps of manufacturing the laminate 50 described above, among the methods of manufacturing the anti-counterfeiting structure, steps common between the anti-counterfeiting structure 10 of the first embodiment and the anti-counterfeiting structure 70 of the second embodiment. In advance of description of the steps of manufacturing the laminate 50, steps of manufacturing a transfer foil to be used for manufacturing the laminate 50 will be described. Note that FIG. 12 shows a part of a cross-sectional structure of the transfer foil for convenience of illustration.

Figure 12:
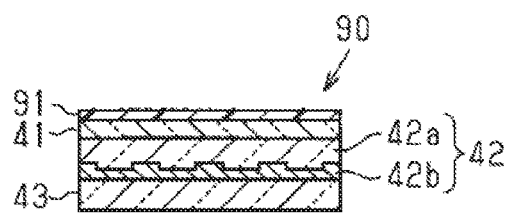
FIG. 12 is a partial cross-sectional view of a transfer foil for forming a device structure.

As shown in FIG. 12, the transfer foil 90 includes a support layer 91, and the peelable layer 41, the optical device 42, and the adhesive layer 43 are laminated on one surface of the support layer 91 of the transfer foil 90 in the stated order.

[Support Layer]

The first step to form the transfer foil 90 is to prepare the support layer 91. The support layer 91 may be resistive to heat applied thereto during a course of forming the transfer foil 90 and be mechanically strong enough to withstand a force applied to the support layer 91 during the course of forming the transfer foil 90.

Examples of the material for forming the support layer 91 include a synthetic resin, a natural resin, paper, and synthetic paper. The support layer 91 may have a single-layer structure constituted by one of the layers formed by the respective forming materials or may have a multilayer structure constituted by two or more thereof.

On an occasion when the material that forms the support layer 91 is a synthetic resin, examples of the material for the support layer 91 include polyvinyl chloride, polyester, polycarbonate, polymethyl methacrylate, polystyrene, polyethylene, polyethylene terephthalate, polyethylene naphthalate, polypropylene, and polyvinyl alcohol. The support layer 91 is preferably approximately 19 µm or more to 50 µm or less thick in terms of operability and processability thereof.

[Peelable Layer]

The peelable layer 41 is formed on one surface of the support layer 91. The peelable layer 41 may only be transmissive to a laser beam and be able to withstand a thermal pressure applied to the peelable layer 41 when the transfer foil 90 is thermally transferred. The peelable layer 41 can be formed of a resin, specifically a thermoplastic resin, a thermosetting resin, an ultraviolet curable resin, or an electron beam curable resin.

On an occasion when the peelable layer 41 is formed of a thermoplastic resin, the resin needs to be heat-resistant. Preferable thermoplastic resins include a polycarbonate resin, a polyether amide resin, a cyclic polyolefin copolymer, a modified norbornene resin, a polyamide imide resin, a polyimide resin, and a nitrocellulose resin.

[Optical Device]

The optical device 42 is formed on a surface of the peelable layer 41, a surface opposite to a surface being in contact with the support layer 91. As described above, the optical device 42 is preferably an OVD. The OVD is an optical device that reproduces a different image when a visual recognition direction of the OVD changes to another direction. Examples of the OVD include a hologram, a diffraction grating, and a multilayer film.

The hologram and the diffraction grating may each be of a relief type, which records an interference fringe of light as a fine uneven pattern on a plane or of a volume type, which records the interference fringe in a thickness direction of the optical device 42.

In a circumstance where the optical device 42 is a relief-type hologram or a relief-type diffraction grating, the optical device 42 has a forming part 42a and an amplifying part 42b, the forming part 42a having a relief surface with a fine uneven pattern, and the amplifying part 42b covering a relief surface of the forming part 42a.

The first step in forming the relief-type hologram or relief-type diffraction grating is to form, by an optical projection method, a master plate of the relief surface having the fine uneven pattern, and then form a nickel press plate having a reproduction of the uneven pattern of the master plate, by an electroplating method.

The next step is to form a coating film for forming the forming part 42a on the surface of the peelable layer 41 opposite to the surface being in contact with the support layer 91 before forming a forming part 42a having the relief surface by pressing the press plate against the coating film and then curing the pressed coating film.

The following step is to form the amplifying part 42b for enhancing a diffraction efficiency in the relief-type hologram or the relief-type diffraction grating on at least a part of the relief surface of the forming part 42a.

The forming part 42a may be a layer where the relief surface is formed by the press plate being pressed thereagainst, and can be formed of an ultraviolet curable resin, a thermosetting resin, a thermoplastic resin, or an electron beam curable resin, more specifically, epoxy (meth)acrylic or urethane (meth)acrylate. The forming part 42a may have a single-layer structure constituted by only one of the layers formed by the respective forming resins described above or may have a multilayer structure constituted by two or more thereof.

Note that the forming part 42a may be formed not only of the materials described above, but of a material having a relief surface, a material that is capable of forming a layer configured to reproduce a different image when a visual recognition direction of the optical device 42 changes to another direction.

The forming part 42a may be formed by a photopolymer method. To form the forming part 42a in the photopolymer method, the forming part 42a may be formed of a monomer, an oligomer, or a polymer having an ethylenic unsaturated bond or an ethylenically unsaturated group.

Examples of the monomer include 1,6-hexanediol, neopentyl glycol diacrylate, trimethylolpropane triacrylate, pentaerythritol triacrylate, pentaerythritol tetraacrylate, dipentaerythritol pentaacrylate, and dipentaerythritol hexaacrylate. Examples of the oligomer include epoxy acrylate, urethane acrylate, and polyester acrylate. Examples of the polymer include a urethane-modified acrylic resin and an epoxy-modified acrylic resin.

The monomer, oligomer, and polymer having the ethylenically unsaturated bond or the ethylenically unsaturated group may be used in mixture of two or more of the materials listed above. In addition, the monomers, the oligomers, and the polymers can be mutually crosslinked by imparting in advance a reactive group that undergoes a crosslinking reaction to the monomers, oligomers and polymers listed above and by use of an isocyanate compound, a silane coupling agent, an organic titanate crosslinking agent, an organic zirconium crosslinking agent, or organic aluminate.

Further, the monomer, oligomer, and polymer having the ethylenically unsaturated bond or the ethylenically unsaturated group may be used in mixture with another resin. In this circumstance, the monomer, oligomer, and polymer can be crosslinked with a skeleton of another resin by imparting in advance a reactive group that undergoes a crosslinking reaction to the monomers, oligomers and polymers listed above and by use of an isocyanate compound, a silane coupling agent, an organic titanate crosslinking agent, an organic zirconium crosslinking agent, or organic aluminate.

Such a method makes it possible to obtain the polymers having the ethylenically unsaturated bond or the ethylenically unsaturated group. These polymers provide high moldability of the relief surface and are less liable to stain the press plate because they are solid at normal temperature and are less tacky.

At a time of use of cationic photopolymerization for curing the forming part 42a, the forming part 42a can be formed of monomers, oligomers and polymers having an epoxy group, oxetane skeleton-containing compounds, or vinyl ethers.

At a time of cure of the electron beam curable resin among the resins listed above by use of ultraviolet and other radiation, a photopolymerization initiator may be added to the electron beam curable resin. Examples of the photopolymerization initiator include a photo radical polymerization initiator, a photocationic polymerization initiator, and a combination type of the photo radical polymerization initiator and the photocationic polymerization initiator, or a hybrid type, depending on which resin to which the photopolymerization initiator is added.

Examples of the photo radical polymerization initiator include benzoin compounds, anthraquinone compounds, phenyl ketone compounds, benzil dimethyl ketal, thioxanthene, acylphosphine oxide, and Michler's ketone. Examples of the benzoin compound include benzoin, benzoin methyl ether, and benzoin ethyl ether. Examples of the anthraquinone compound include anthraquinone and methylanthraquinone. Examples of the phenyl ketone compound include acetophenone, diethoxyacetophenone, benzophenone, hydroxyacetophenone, 1-hydroxycyclohexyl phenyl ketone, α-aminoacetophenone, and 2-methyl-1-(4-methylthiophenyl)-2-morpholinopropane-1-one.

The photocationic polymerization initiator may be an aromatic diazonium salt, an aromatic iodonium salt, an aromatic sulfonium salt, an aromatic phosphonium salt, a mixed ligand metal salt, or the like.

The hybrid type photopolymerization initiator may be a photopolymerization initiator prepared by mixing a photo radical polymerization initiator and a photocationic polymerization initiator, or may be a photopolymerization initiator that is capable of initiating both photopolymerization and photocationic polymerization. Examples of the photopolymerization initiator capable of initiating both the photoradical polymerization and the photocationic polymerization include, for example, an aromatic iodonium salt and an aromatic sulfonium salt.

A blending amount of the photopolymerization initiator relative to the electron beam curable resin may be determined according to the electron beam curable resin and the photopolymerization initiator. The photopolymerization initiator is preferably added at a ratio between 0.5 wt % or more and 15 wt % or less to the electron beam curable resin.

In addition, a sensitizing dye may be added to a mixture containing the electron beam curable resin and the photopolymerization initiator. Still further, a dye, a pigment, various additives, a crosslinking agent, or the like may be added as necessary. In order to improve the moldability of the forming part 42a, a resin nonreactive to the photopolymerization reaction may be added.

Examples of the various additives include a polymerization inhibitor, a leveling agent, a defoaming agent, an anti-fouling agent, an adhesion improving agent, a coating surface modifying agents, a plasticizer, and a nitrogen-containing compound. An exemplary crosslinking agent is an epoxy resin. The nonreactive resin may be the thermoplastic resin or a thermosetting resin listed above.

The amplifying part 42b is a part configured to enhance the diffraction efficiency on the relief surface of the forming part 42a, and is formed of a material having a different refractive index from the resin forming the relief surface that is a polymeric material. The material for forming the amplifying part 42b may be a dielectric material or a metallic material. Examples of the dielectric material include $TiO_2$, $Si_2O_3$, SiO, $Fe_2O_3$, and ZnS. Examples of the metallic material include Sn, Cr, Ni, Cu, and Au. The amplifying part 42b may have a single-layer structure constituted by only one of the layers formed by the respective forming materials listed above or may have a multilayer structure constituted by two or more thereof.

The amplifying part 42b can be formed by a vacuum deposition method, a sputtering method, and other methods. The thickness of the amplifying part 42b is determined at approximately 50 Å or more to 10000 Å or less according to a function required thereof.

The amplifying part 42b may be formed on the whole relief surface of the forming part 42a, but may be formed on a part of the relief surface. Forming the amplifying part 42b on the part of the relief surface follows the steps of: printing an ink containing a water-soluble resin on the part of the relief surface where the amplifying part 42b is not to be formed; forming a film for forming the amplifying part 42b on the whole relief surface; and washing the water-soluble resin to remove the film formed on a part overlapping with the water-soluble resin in the thickness direction of the optical device 42.

The amplifying part 42b can be also formed in a part of the relief surface by the steps of: forming a film for forming the amplifying part 42b on the whole relief surface; forming a mask in an area on the relief surface for the amplifying part 42b, the area being a part of the film; and exposing the film to an alkaline or acidic chemical that dissolve the film to remove the part of the amplifying part 42b. Using a laser is another method such as a laser removal method to remove the part of the film for forming the amplifying part 42b.

Thus forming the amplifying part 42b on a part of the relief surface makes it possible for the anti-counterfeiting structure 10, 70 having the optical device 42 to represent a predetermined visible information formed by the amplifying part 42b, which can in turn provide a better design of the anti-counterfeiting structure 10, 70.

On an occasion when the adhesive layer 43 is formed of a material that is cured by irradiation with ultraviolet rays or an electron beam, and when the amplifying part 42b is formed of a material that allows substantially no transmission of the ultraviolet rays and the electron beam, forming the amplifying part 42b on the part of the relief surface can provide the following effects.

In other words, emitting ultraviolet rays or an electron beam from the peelable layer 41 toward the adhesive layer 43 does not irradiate the part overlapping with the amplifying part 42b in a plan view of the optical device 42, but does irradiate the part not overlapping with the amplifying part 42b.

Naturally, the part of the adhesive layer 43 irradiated with the ultraviolet rays or the electron beam is cured, while the unirradiated part is not cured. At a time of removal of the device structure 15 from the allochroic layer 21, therefore, the cured part of the adhesive layer 43 is not easily removed from the allochroic layer 21, whereas the uncured part is easily removed therefrom. A part of the device structure 15 is consequently easily broken by a force applied thereto at the time of the removal of the device structure 15 from the allochroic layer 21.

On the other hand, on an occasion when the optical device 42 is a multilayer film formed from a plurality of thin films, a multilayer film that causes the optical device 42 to present a different image color in response to a change in the visual recognition direction thereof, the optical device 42 is constituted as described below.

The optical device 42 is a multilayer film constituted by a plurality of layers each having a different optical characteristic. Typically, a material with a refractive index over approximately 1.5 and below 2 is referred to as a low refractive index material, while a material with a refractive index of 2 or greater is referred to as a high refractive index material. A layer formed of a high refractive index material is referred to as a high refractive index layer, while a layer formed of a low refractive index material is referred to as a low refractive index layer.

A multilayer film including both a low refractive index layer and a high refractive index layer may be a structure of two or more high refractive index layers and one low refractive index layer being alternately stacked. Each layer of the multilayer film may be formed of the materials shown in the following Table 1.

TABLE 1

| Material | Refractive index (n) | Material | Refractive index (n) |
|---|---|---|---|
| $Sb_2S_3$ | 3.0 | SiO | 2.0 |
| $Fe_2O_3$ | 2.7 | $Si_2O_3$ | 2.5 |
| $TiO_2$ | 2.6 | $In_2O_3$ | 2.0 |
| CdS | 2.6 | PbO | 2.6 |
| $CeO_2$ | 2.3 | $Ta_2O_3$ | 2.4 |
| ZnS | 2.3 | $ZnO_2$ | 2.1 |
| $PbCl_2$ | 2.3 | $ZrO_2$ | 2.0 |
| CdO | 2.2 | $Cd_2O_3$ | 1.8 |
| $Sb_2O_3$ | 2.0 | $WO_3$ | 2.0 |

Note that, in addition to the materials shown in Table 1, layers constituting the multilayer film may be formed solely of Fe, Mg, Zn, Au, Ag, Cr, Ni, and Cu, and other metal or of an alloy containing at least two of these, or may be formed of Si.

The layers constituting the multilayer film may be also formed of an organic polymer with a low refractive index. Examples of the organic polymer include polyethylene, polypropylene, polytetrafluoroethylene, polymethyl methacrylate, and polystyrene. Incidentally, the refractive indexes of these materials are: 1.51 for polyethylene, 1.49 for polypropylene, 1.35 for polytetrafluoroethylene, 1.49 for polymethyl methacrylate, and 1.60 for polystyrene. In addition, a layer formed of these organic polymers is a low refractive index layer.

The multilayer film may have a structure in which at least one layer with a predetermined thickness selected from the high refractive index layer described above and a metal layer with a light transmittance between 30% or more and 60% or less and at least one layer with a predetermined thickness selected from low refractive index layers are alternately stacked. A multilayer film with such a structure can be configured to have a characteristic of absorbing or reflecting visible light having a predetermined wavelength.

Each layer of the multilayer film may be formed of a material selected from the above materials according to optical characteristics such as refractive index, reflectance, and transmittance, weather resistance, interlayer adhesiveness, etc.

Each layer of the multilayer film may be formed by a vacuum deposition method, a sputtering method, or another method. These methods can control a thickness, a film formation rate, an optical film thickness (optical film thickness=n×d, where n: refractive index, d: film thickness), etc.

[Adhesive Layer]

The adhesive layer 43 is formed overall on a surface of the optical device 42 opposite to a surface being in contact with the peelable layer 41. The adhesive layer 43 is a layer for fixing a structure constituted by the support layer 91 and the optical device 42 to the allochroic layer 21.

The adhesive layer 43 is preferably formed of a pressure sensitive material, that is, a resin that exhibits adhesion to the allochroic layer 21 by application of a pressure to the adhesive layer 43. A thermoplastic resin can be used to form the adhesive layer 43. Examples of the thermoplastic resin include an acrylic resin, a vinyl chloride-vinyl acetate copolymer, an epoxy resin, and an ethylene-vinyl acetate copolymer (EVA).

The adhesive layer 43 may be formed by use of, for example, a gravure coater, a micro gravure coater, or a roll coater. The transfer foil 90 to be used for manufacturing the anti-counterfeiting structure 10, 70 is thereby formed.

[Allochroic Layer]

The first step to manufacture the laminate 50 by use of the transfer foil 90 is to prepare the allochroic layer 21. The allochroic layer 21 may be configured to exhibit in response to laser irradiation a color different from that before being irradiated. In other words, the allochroic layer 21 may have a characteristic of changing a first material thereof to a second material in response to laser irradiation. The allochroic layer 21 may be formed of an inorganic material, a metallic material, an organic material, or a polymer material. The allochroic layer 21 is preferably formed of a material having a characteristic of starting discoloration when it is laser-irradiated with a predetermined or higher level of intensity, that is, having a threshold of the intensity of the laser beam.

The allochroic layer 21 may be formed of a material that is capable of absorbing laser pulse energy, carbonizing at a temperature equal to or higher than a predetermined temperature, and recording information. Such materials may be a material containing polycarbonate as a main component or a material containing polyester as a main component.

The allochroic layer 21 may be also formed of a mixture that is used for a black coloring layer or a color coloring layer, a mixture organized to develop color by virtue of laser irradiation.

Among such mixtures, a mixture containing a thermally responsive microcapsule is preferable in requiring a low level of energy for coloring the allochroic layer 21, compared with a mixture containing no thermoresponsive microcapsules.

The allochroic layer 21 may be also formed of a mixture organized to develop color by virtue of laser irradiation. The mixture may be a mixture of a black color-developing layer and a color-developing layer. Examples of the photosensitive resin include an ultraviolet curable resin and an electron beam curable resin. Preferably, such a mixture includes a promoting compound that promotes modification of the discolored compound by virtue of laser irradiation, or bonds the promoting compound to a skeleton of the photosensitive resin for convenience of control over a threshold temperature at which the mixture discolors.

The allochroic layer 21 may be also formed of a synthetic resin containing an additive. The additive may be at least one of a synthetic resin modified by laser irradiation, an inorganic material that promotes the modification of a synthetic resin as a main component by virtue of laser irradiation, a synthetic resin that contains an organic material, and an inorganic material that absorbs a laser beam and produces heat. In addition, the allochroic layer 21 may be formed of a mixture containing a transparent resin and at least one of a light-absorbent material and a thermo-sensitive coloring material.

The allochroic layer 21 may be formed as a film formed by use of the materials for forming the allochroic layer 21 listed above. The allochroic layer 21 may be formed by wet-coating a surface of another layer with a coating liquid produced by dissolving in a solution the material that forms the allochroic layer 21 or a coating liquid dispersed in a liquid. The allochroic layer 21 may be also formed on one surface of another layer by a dry coating method such as vacuum deposition and sputtering.

[Transferring]

Figure 13:
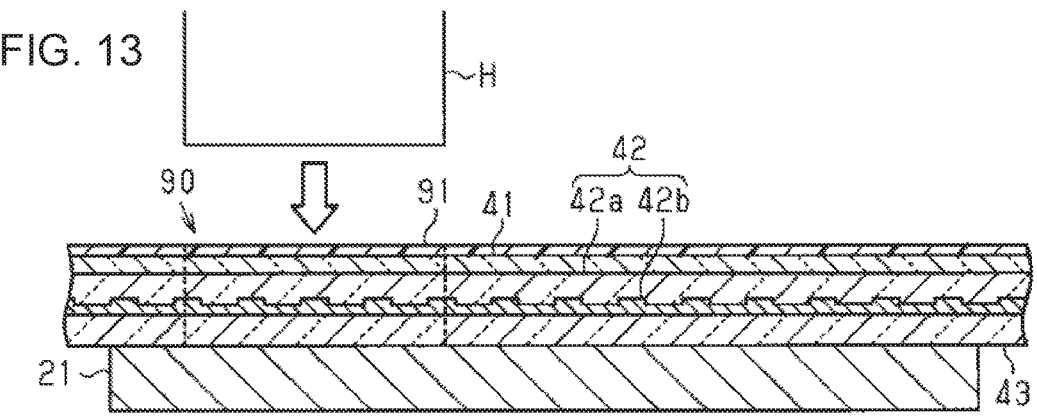
FIG. 13 illustrates a process of transferring a part of the transfer foil to an allochroic layer.

As shown in FIG. 13, the transfer foil 90 is transferred to a part of the allochroic layer 21 in the plan view of the allochroic layer 21 in a state such that the adhesive layer 43 of the transfer foil 90 maintains contact with the allochroic layer 21. The transfer foil 90 may be spot-transferred to the allochroic layer 21 by a vertical stamping method, or transferred thereto by a roll transfer method.

The first step of transferring the transfer foil 90 to the allochroic layer 21 by use of the vertical stamping method is to overlap the transfer foil 90 with one side of the allochroic layer 21 in a state such that the adhesive layer 43 of the transfer foil 90 faces the allochroic layer 21. The next step is to press a heated hot stamp H against the support layer 91 of the transfer foil 90. This softens a part of the allochroic layer 43 overlapping with the hot stamp H in a plan view of the allochroic layer 43 and adheres the softened part to the allochroic layer 21.

Figure 14:
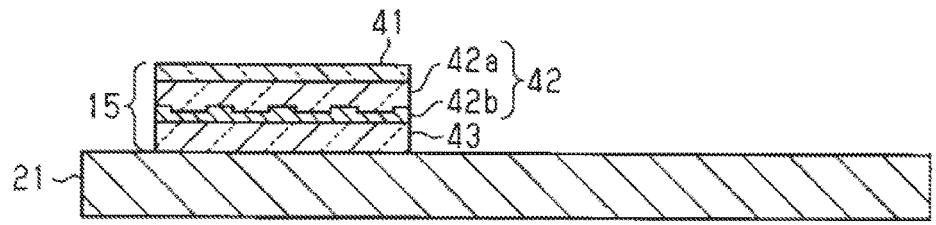
FIG. 14 illustrates the process of transferring a part of the transfer foil to the allochroic layer.

As shown in FIG. 14, a position of the transfer foil 90 relative to the allochroic layer 21 is changed from a relative position at a time when a part of the transfer foil 90 is adhered. This removes the support layer 91 from the removable member 41 at the part of the transfer foil 90 to which the adhesive layer 43 is adhered, and consequently transfers the part of the transfer foil 90 to the allochroic layer 21 as the device structure 15.

[Foam-Promoting Unit]

Figure 15:
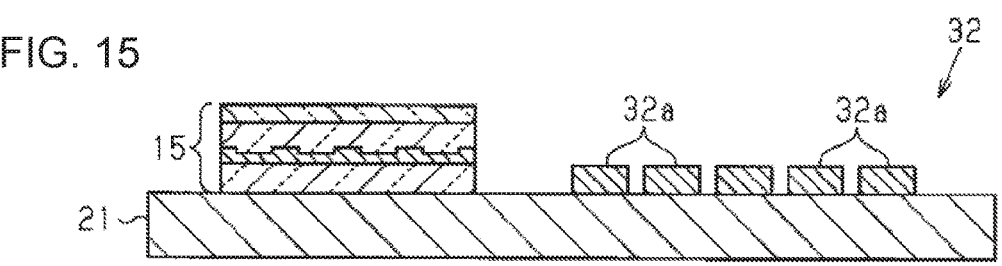
FIG. 15 illustrates a process of forming a foam-promoting unit in an allochroic layer.

As shown in FIG. 15, a foam-promoting unit 32, which consists of a plurality of foam-promoting portions 32a, is formed in a part of the surface of the allochroic layer 21 to which the device structure 15 is transferred, a part different from the part where the device structure 15 is located. Note that the foam-promoting unit 32 may be formed before the part of the transfer foil 90 is transferred to the allochroic layer 21.

The foam-promoting unit 32 may be configured to cause the foamable member 31 to foam when it is laser-irradiated, the foamable member 31 being in contact with the foam-promoting unit 32. In other words, the foam-promoting unit 32 may be configured to have a characteristic of changing an unfoamed part of the foamable member 31 to attain a foamed state, the part being in contact with the foam-promoting unit 32. The foam-promoting unit 32 has a function of increasing energy of the laser beam applied to the foam-promoting unit 32, applying to the foamable member 31 energy more than in a state in which the foamable member 31 is not in contact with the foam-promoting unit 32.

The foam-promoting unit 32 thus heats the foamable member 31 to a temperature higher than it heats the foamable member 31 on an occasion when the foamable member 31 is laser-irradiated with the same being not in contact with the foam-promoting unit 32, and decomposes a part of the foamable member 31. Since the foamable member 31 is formed of various resins as described above, the decomposition of the foamable member 31 generates gas containing carbon and oxygen constituting the same between the foamable member 31 and the foam-promoting unit 32 or in the foamable member 31.

The foam-promoting unit 32 can be formed of an ink that scatters infrared rays having a 1064-nm wavelength, a reflective ink, or an absorbent ink. The ink reflecting the infrared rays having the 1064-nm wavelength may be an ink containing a pearl pigment. Note that the infrared ray having the 1064-nm wavelength is used at a time of laser printing, that is, at a time when information is formed on the allochroic layer 21 by use of a laser. The ink that scatters infrared rays may be an ink containing an oxide pigment. A particle of a compound can be used as the pigment, and an inorganic compound can be used as the particle of the compound. Examples of the inorganic compound include titanium oxide, silica, and alumina. The ink that absorbs the infrared rays having the 1064-nm wavelength may be a polymer having a molecular bond that absorbs the infrared rays having the 1064-nm wavelength.

The pearl pigment typically includes a core part formed of mica and a coating part covering the core part. The coating part may be formed of any material that makes the mica reflective. The material may assume a transparent color in a visible region and may be metal oxide, metal sulfide, metal selenide, metal chloride, or the like having a refractive index of 2.0 or greater.

An inorganic compound can be used to form the coating part. Examples of the inorganic compound include $Sb_2S_3$, $Fe_2O_3$, PbO, ZnSe, CdS, $Bi_2O_3$, $TiO_2$, $PbCl_2$, $CeO_2$, $Ta_2O_5$, ZnS, ZnO, CdO, $Nd_2O_3$, $Sb_2O_3$, SiO, and $In_2O_3$. The coating part may have a single-layer structure constituted by one of the layers formed by the respective forming materials or may have a multilayer structure constituted by two or more thereof.

The pearl pigment, incidentally, has an effect of promoting laser marking of a resin, that is, discoloration of the resin. The pearl pigment is recognized to enable a polyolefin resin to discolor when the pearl pigment is added to a polyolefin resin and other material that do not discolor even when it is laser-irradiated.

It is also recognized that the mica forming the core part of the pearl pigment sensitizes a reaction in the resin caused by the laser beam. In other words, the core and coating parts constituting the pearl pigment have a function of absorbing the laser beam to make the resin that is in contact with the pearl pigment warmer than on an occasion when these parts are laser-irradiated in a state in which the pearl pigment is not in contact with the resin. This allows decomposition of the resin to form carbon in the resin with a result that the generated carbon is recognized as a black discolored part. Note that, in a configuration where the coating part contains $TiO_2$ or the resin contains $TiO_2$, the laser irradiation produces black low-order titanium oxide.

In addition, in a circumstance where there is a difference in refractive index by more than 0.4 between the core part and the coating part, the pearl pigment is highly reflective to white light incident thereon and is birefringent at an interface between the core part and the coating part. The pearl pigment can thus reflect rainbow-colored light. The pearl pigment to be used to form the foam-promoting unit 32 has only to have a function of causing the foamable member 31 to foam. The pearl pigment therefore may be one that reflects the rainbow-colored light, or may be one that reflects bicolored light.

The pearl pigment may assume a spherical shape, a scaly shape, and other shape. A pearl pigment having a spherical particle is preferably around 1 μm or more to 50 μm or less on average in diameter, more preferably around 1 μm or more to 15 μm or less. An ink for forming the foam-promoting unit 32 may contain a coloring agent.

[Base Material]

The subsequent step is to prepare a base material 23. On an occasion when the anti-counterfeiting structure 10, 70 is a card of various types, the base material 23 is preferably formed of polycarbonate (PC). The base material 23 is also preferably formed of polyethylene terephthalate (PET), thermoplastic polyester having amorphous, or noncrystalline, property (PETG), polyvinyl chloride (PVC), an ABS resin, or others.

The base material 23 may have a single-layer structure constituted by one of the layers formed by the respective resins listed above or may have a multilayer structure constituted by two or more thereof.

Note that the base material 23 may be attached to one surface of the allochroic layer 21 before at least one of the step in which the transfer foil 90 is transferred to the allochroic layer 21 and the step in which the foam-promoting unit 32 is formed. Alternatively, the allochroic layer 21 may be formed on one surface of the base material 23.

[Foamable Member]

The foamable member 31 is prepared. Preferably, the allochroic layer 21 having the device structure 15 transferred and the foam-promoting unit 32 formed is sandwiched between the base material 23 and the foamable member 31, so that the base material 23, the foamable member 31, and the allochroic layer 21 are laminated.

Figure 16:
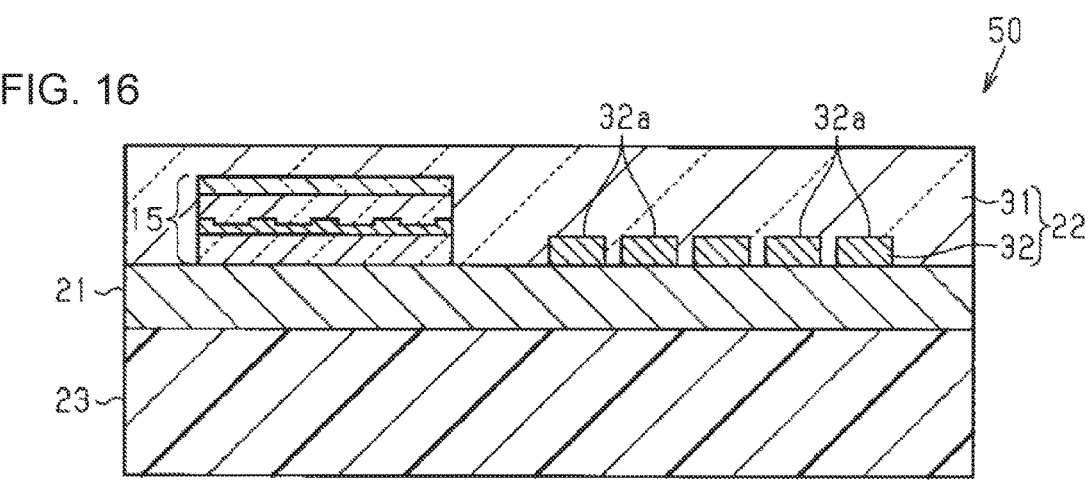
FIG. 16 is a cross-sectional view of a laminate.

The laminated body 50 can be thus produced as shown in FIG. 16. Note that the foamable member 31 may be formed by application of a coating liquid that contains a material that forms the foamable member 31 on the surface of the allochroic layer 21 to which the device structure 15 has been transferred and the foam-promoting unit 32 has been formed.

The foamable member 31 may be configured to be transmissive to a laser beam. The foamable member 31 preferably has a 60% or more to 100% or less transmittance to the light present in the visible light region, more preferably an 80% or more to 100% or less transmittance.

In addition, the foamable member 31 is a layer that foams in response to laser irradiation.

The foamable member 31 has a function of decomposing the material forming the foamable member 31 and generating gas when the foamable member 31 reaches a predetermined or higher temperature.

Examples of the material for forming the foamable member 31 include light-transmissive resins, namely polycarbonate (PC), plant-derived polycarbonate (bio PC), polyethylene terephthalate (PET), polysiloxane 1,4-dimethyl phthalate (PCT), polystyrene (PS), polymethyl methacrylate (PMMA), transparent acrylonitrile butadiene styrene copolymerized synthetic resin (MABS), polyvinyl chloride (PVC), polypropylene (PP), and polyethylene (PE) polyacetal.

The foamable member 31 may be configured to absorb, reflect, or scatter the laser beam applied to the foamable member 31 as long as it is transmissive to the laser beam and is configured to foam in response to laser irradiation.

On an occasion when the foamable member 31 is configured to absorb a part of the laser beam emitted to it, the following effect can be achieved in a part where the allochroic layer 21 and the foamable member 31 are in contact with each other at a time of laser irradiation for discoloring the allochroic layer 21 from the base material 23 toward the allochroic layer 21.

In other words, the foamable member 31 absorbs parts of the laser beam emitted onto the allochroic layer 21 that have passed through the foamable member 31 without being absorbed by the allochroic layer 21. Then the part of the foamable member 31 that has absorbed the laser beam produces heat, and a part of the heat is transmitted to the allochroic layer 21. This can facilitate discoloration of a part of the allochroic layer 21. Note that, in such a configuration, the allochroic layer 21 and the foamable member 31 are preferably in direct contact with each other.

The light-absorbent foamable member 31 may be formed of the light-transmissive resin listed above to which the light-absorbent material is added or have a configuration in which a light-absorbent material is applied to the surface of the foamable member 31 being in contact with the allochroic layer 21.

Examples of the light-absorbent materials include a polyvalent metal hydroxide, an organic aluminum compound, salts such as nitrate, silicate, phosphate, oxalate, aluminum salt, and other salt, and a colorant material. Examples of the colorant material include a cyanine colorant, a phthalocyanine colorant, a diimmonium colorant, an anthraquinone colorant, and an aluminum colorant.

An amount of the light-absorbent material to be added to the light-transmissive resin may be determined depending on a wavelength of the laser beam applied to the foamable member 31, the light-transmissive resin, and the light-absorbent material. The amount to be added may be selected depending on an absorption efficiency relative to a laser beam energy, the light transmittance of the foamable member 31, an influence on other layers of the anti-counterfeiting structure 10, and other factors.

On an occasion when the foamable member 31 is configured to scatter the laser beam that irradiated the same, the following effect can be achieved in a part where the allochroic layer 21 and the foamable member 31 are in contact with each other at a time of laser irradiation for discoloring the allochroic layer 21 from the base material 23 toward the allochroic layer 21.

In other words, the foamable member 31 reflects or scatters parts of the laser beam emitted onto the allochroic layer 21 that have passed through the foamable member 31 without being absorbed by the allochroic layer 21. At least a part of the light reflected or scattered by the foamable member 31 thus irradiates the allochroic layer 21 again. The allochroic layer 21 therefore absorbs the laser beam more efficiently.

On an occasion when the foamable member 31 is light-absorbent, light-reflective, or a light-scattering, the foamable member 31 is preferably 10 µm or more to 1000 µm or less thick.

On an occasion when the foamable member 31 is light-reflective, the foamable member 31 is formed of a metal oxide film configured to selectively reflect a light with the wavelength of the laser beam emitted to the foamable member 31, and a multilayer film.

Among them, the multilayer film is a laminate of a plurality of layers selected from a metal layer and a dielectric layer, a plurality of layers each having a different refractive index.

On an occasion when the multilayer film consists of at least one of the metal layer and a low molecular dielectric layer, the multilayer film can be formed on one surface of the base material 23 by a vapor deposition method, a sputtering method, or the like. On an occasion when the multilayer film consists of a polymer dielectric layer, the multilayer film formed into a film shape can be bonded to the base material 23.

The foamable member 31 formed from a metal oxide film or a multilayer film is preferably 5 nm or more to 1000 nm or less thick.

Note that, on an occasion when the laser that irradiates the laminate 50 is an infrared laser, the foamable member 31 may have a multilayer structure in which an indium oxide layer, a metal layer, and a metal oxide layer are stacked, or may be a titanium oxide layer having an oxygen-deficient anatase structure.

On an occasion when the foamable member 31 has a light-scattering property, the foamable member 31 may have a configuration in which a surface being in contact with the allochroic layer 21 is made rougher in the light-reflective foamable member 31 described above.

Alternatively, the foamable member 31 may have a configuration in which a material that reflects light with a wavelength of a laser beam emitted to the laminate 50 is dispersed in the light-transmissive resins listed above. Examples of the light-reflective material include crushed pieces of material for the light-reflective foamable member 31 and particles whose refractive index to light in a wavelength range of the laser beam is different from that of a light-transmissive e resin. The refractive index to light in the wavelength range of the laser beam is preferably different by 0.3 or more between the light-transmissive resin and the particles.

[Laser Irradiation]

Information included in the discolored parts 11, 71 formed on the anti-counterfeiting structure 10 in response to laser irradiation may be personal authentication information that can be used for personal authentication. The personal authentication information may include at least one of biological information and non-biological information.

The biometric information is a characteristic unique to an individual, a characteristic authenticated among biometric features. The information typically includes an image or pattern of a face, a fingerprint, and a vein. The non-biometric information is personal information other than the biometric information. The non-biometric personal information typically includes one's name, date of birth, age, blood type, sex, nationality, address, domicile, telephone number, department name, and job title.

As described above, the individual is one category, and each item of information included in the biometric information and each item of information included in the non-biometric information are one element included in a plurality of elements constituting the category.

The laser 60 described above is a far-infrared laser including a $CO_2$ laser, a near-infrared pulse laser including an Nd:YAG laser and an Nd:YVO laser, a pulsed laser of visible light, an excimer laser, or the like. The laser 60 may also be an ultraviolet laser by use of a third harmonic of an Nd:YAG laser or an Nd:YVO laser, a semiconductor laser, a femtosecond laser, a picosecond laser, or the like.

Among these lasers, a laser using the third harmonic of a Nd:YAG laser or Nd:YVO laser is preferable in that it has high resolution and that the allochroic layer 21 is highly absorbent to a laser beam because the wavelength of the laser beam is included in the ultraviolet range.

In addition, a ultrashort pulse laser such as a femtosecond laser and a picosecond laser can cut a bond of molecules constituting the allochroic layer 21 in a state in which the laser-irradiated allochroic layer 21 remains cool. This makes it possible to record visible information on the allochroic layer 21 in a state in which substantially no heat is applied to the allochroic layer 21.

Compared with other lasers, in addition, the YAG laser and the semiconductor laser are preferable in being capable of serving as a small device that emits a large amount of thermal energy, and in being capable of recording visible information on the allochroic layer 21 on demand.

EXAMPLES

Example 1

A 25-μm-thick transparent polyethylene terephthalate (PET) film was prepared as a support layer having the transfer foil. Then an ink for a peelable layer with the following composition was applied onto one side of the support layer to form a coating film. The coating film was then dried at 120° C. for 45 seconds so that the peelable layer would be 2 μm thick.

An ink for a forming part with the following composition was applied onto the surface of the peelable layer opposite to the surface being in contact with the support layer. The coating film was then dried at 120° C. for 45 seconds and was 3 μm thick. A surface opposite to the surface being in contact with the peelable layer of the dried coating film was irradiated with ultraviolet rays after a fine uneven pattern was formed by a roll embossing method. A formed part with a relief surface having a fine uneven pattern was thus formed on the surface opposite to the surface being in contact with the peelable layer.

A 1000-Å-thick titanium oxide layer was subsequently formed as a light-reflective amplifying part on the relief surface of the formed part by a vacuum evaporation method. An ink for an adhesive layer, an ink with the following composition, was applied onto a surface of the amplifying part opposite to a surface being in contact with the formed part to form a coating film that serves as an adhesive layer that would be 3 μm thick after the coating film was dried. This is how the transfer foil for forming the anti-counterfeiting structure of Example 1 was produced.

[Ink for Peelable Layer]
Polyamide-imide resin . . . 40 parts
Dimethylacetamide . . . 30 parts
Tetrahydrofuran . . . 30 parts
[Ink for Forming Part]
UV curable acrylic resin . . . 80 parts
Silane coupling agent . . . 13 parts
Release agent . . . 7 parts
[Ink for Adhesive Layer]
Polyurethane resin . . . 30 parts
Methyl ethyl ketone . . . 70 parts After preparation of a 100-μm-thick allochroic layer (Makrofol ID4-4 laserable manufactured by Bayer) (Makrofol is a registered trademark), a hot stamp whose plate surface temperature was 131° C. was pressed against the support layer with 1.2 t pressure with an adhesive layer of the transfer foil being in contact with one surface of the allochroic layer. Then changing a position of the transfer foil relative to the allochroic layer removed the support layer from a foamable member included in a part adhered to the allochroic layer of the transfer foil.

An ink for the foam-promoting unit having the following composition was then applied by a screen printing method onto the allochroic layer to which the device structure was transferred. At that time, a plurality of promoting members representing a character string, "Nationality ID", were formed as a promoting member constituting the foam-promoting unit so that the members would be 5 μm thick after being dried.

[Ink for Foam-Promoting Unit]
Pearl pigment
(Iriodin 111 Rutile Fine Satin, manufactured by Merck Japan Ltd.) . . . 30 parts
(Iriodin is a registered trademark)
Ultraviolet curable screen ink . . . 70 parts A 600-μm-thick base material and a 125-μm-thick foamable member (Makrofol ID 6-2_000000 manufactured by Bayer) were prepared. The base material, the allochroic layer, and the foamable member were then laminated under a condition of 190° C. and 100 kgf/cm2 for 3 minutes by use of a hydraulic molding machine in a state in which the allochroic layer having a device structure transferred and the foaming-promoting unit formed was sandwiched between the base material and the foamable member. The base material, the allochroic layer, and the foamable member were further laminated under a condition of 25° C. and 100 kgf/cm2 for 3 minutes. The laminate of Example 1 was thus produced.

The laminate was laser-irradiated by use of a YVO4 laser (MD-V9600A manufactured by Keyence Corporation). At that time, the laminate was irradiated with a laser beam emitted from the foamable member toward the foam-promoting unit, and with a laser beam emitted from the foamable layer toward the allochroic layer. Thus a foamed part was formed in the laser-irradiated part on the foamable layer, and a discolored part was formed in the laser-irradiated part of the allochroic layer. A discolored part including each of the first information, the fourth information, and the other information was formed by forming a discolored part in the allochroic layer. The anti-counterfeiting structure of Example 1 was thus produced.

An attempt to remove the foamable member from the allochroic layer of the anti-counterfeiting structure to remove from the allochroic layer the device structure sandwiched between the allochroic layer and the foamable member found out that the foamed part formed in the foamable member was crushed. In other words, it was recognized that a part, where the foamed part deformed from what it had been before the removal of the foamable member, was formed as a trace of the foamable member being removed.

At a time of a visual recognition of the anti-counterfeiting structure in a state in which the viewing angle was an initial angle, the fourth information, which consists of the first member and the second member, was visually recognized, whereas changing the viewing angle by tilting the anti-counterfeiting structure relative to the line-of-sight direction found out that the second part of the fourth information was visually recognized with the second part being distinguished from the first part.

What is claimed is:

1. An anti-counterfeiting structure comprising
A) an allochroic layer comprising a) an untreated portion comprising a first material, which carbonizes to a second material in response to laser radiation and b) a discolored portion within a first portion of a surface of the allochroic layer, the discolored portion consists of the second material formed from the first material in response to the laser radiation and contains first information;
B) a foam-promoting unit comprising a plurality of foam-promoting portions on a second portion of the surface of the allochroic layer, the second portion does not overlap with the first portion of the surface of the allochroic layer, and
C) a foamable layer comprising a material, which changes from an unfoamed state to a foamed state in response, the foamable layer includes a foamed part a plurality of features that contain second information, individual features of the foamed part correspond in the plain view to individual foam-promoting portions of the foam-promoting unit, wherein an individual feature of the foam-promoting unit protrudes from a surface of the foamable layer in a direction away from the allochroic layer and wherein a space between an individual foam-promoting portion of a form-promoting unit and an individual feature of the foamed part contains gas produced by foaming the material of the foamable layer.

2. The anti-counterfeiting structure of claim 1, further comprising an optical device, which is a hologram, a diffraction grating, and a multilayer film, located over the first portion of the surface of the allochroic layer, the optical device is covered by the foamable layer and displays third information.

3. The anti-counterfeiting structure of claim 2, wherein the optical device is a hologram or a diffraction grating.

4. The anti-counterfeiting structure of claim 3, wherein the optical device is a relief-type hologram or a relief-type diffraction grating.

5. The anti-counterfeiting structure of claim 4, wherein the optical device comprises a forming part and an amplifying part, the forming part having a relief surface with a fine uneven pattern, and the amplifying part covering the relief surface of the forming part.

6. The anti-counterfeiting structure of claim 5, wherein the forming part comprises a resin material selected from an ultraviolet curable resin, a thermosetting resin, a thermoplastic resin, or an electron beam curable resin.

7. The anti-counterfeiting structure of claim 6, wherein the amplifying part comprises material having a different refractive index from the resin material of the forming part.

8. The anti-counterfeiting structure of claim 1, wherein the allochroic layer comprises polycarbonate or polyester.

9. The anti-counterfeiting structure of claim 1, wherein the allochroic layer is a mixture containing a thermally responsive microcapsule.

10. The anti-counterfeiting structure of claim 1, wherein the allochroic layer comprises a photosensitive resin.

11. The anti-counterfeiting structure of claim 1, wherein the allochroic layer comprises a transparent resin and at least one of a light-absorbent material and a thermo-sensitive coloring material.

12. The anti-counterfeiting structure of claim 1, wherein the foam-promoting unit comprises a pigment.

13. The anti-counterfeiting structure of claim 12, wherein the pigment is a pearl pigment.

14. The anti-counterfeiting structure of claim 12, wherein the pigment is an oxide pigment.

15. The anti-counterfeiting structure of claim 1, wherein the foam-promoting unit comprises a polymer having a molecular bond that absorbs infrared rays having a 1064-nm wavelength.

16. The anti-counterfeiting structure of claim 1, wherein the foamable layer has an 80% or more to 100% or less transmittance in the visible light region.

17. The anti-counterfeiting structure of claim 1, wherein the foamable layer comprises a light transmissive resin.

* * * * *